US011481999B2

(12) United States Patent
Hishinuma et al.

(10) Patent No.: US 11,481,999 B2
(45) Date of Patent: Oct. 25, 2022

(54) MAINTENANCE WORK SUPPORT SYSTEM AND MAINTENANCE WORK SUPPORT METHOD

(71) Applicants: Kabushiki Kaisha Toshiba, Minato-ku (JP); Toshiba Energy Systems & Solutions Corporation, Kawasaki (JP)

(72) Inventors: Tomomi Hishinuma, Toshima (JP); Kenji Osaki, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/671,325

(22) Filed: Nov. 1, 2019

(65) Prior Publication Data

US 2020/0151450 A1    May 14, 2020

(30) Foreign Application Priority Data

Nov. 13, 2018 (JP) .............................. JP2018-213225
Oct. 23, 2019 (JP) .............................. JP2019-192706

(51) Int. Cl.
*G06V 20/20* (2022.01)
*G06T 7/70* (2017.01)
*G06T 7/50* (2017.01)

(52) U.S. Cl.
CPC .............. *G06V 20/20* (2022.01); *G06T 7/50* (2017.01); *G06T 7/70* (2017.01); *G06T 2207/30204* (2013.01); *G06T 2207/30244* (2013.01)

(58) Field of Classification Search
CPC ........... G06T 19/006; G06T 7/70; G06T 7/50; G06T 2207/30204; G06T 2207/30244;
(Continued)

(56) References Cited

U.S. PATENT DOCUMENTS 11,036,055 B2 * 6/2021 Ninan .................... G06F 1/1656
2014/0285522 A1 * 9/2014 Kim .................... G06Q 30/0601
345/633

(Continued)

FOREIGN PATENT DOCUMENTS

JP    2010-061262 A    3/2010
JP    5733720 B2    6/2015
(Continued)

*Primary Examiner* — Jennifer Mehmood
*Assistant Examiner* — Donna J. Ricks
(74) *Attorney, Agent, or Firm* — Maier & Maier, PLLC

(57) ABSTRACT

A maintenance work support system comprising: a database in which support information for supporting maintenance work is registered; a camera-image acquisition unit configured to acquire a camera-image imaged by a camera that is mounted on a terminal possessed by a worker performing the maintenance work; a position/attitude estimation unit configured to estimate a position and attitude of the terminal based on information that is obtained by at least one device mounted on the terminal; a target recognition unit configured to recognize a target of the maintenance work depicted in the camera-image; and a superimposed display unit configured to perform display processing in such a manner that the support information corresponding to the target acquired from the database is superimposed on least part of an image of the target visually recognized by the worker.

13 Claims, 18 Drawing Sheets

(58) Field of Classification Search
CPC . G06T 2207/20084; G06T 7/74; G06T 7/248; G06T 2200/04; G06T 2207/10021; G06T 2207/30208; G06K 9/00671; G06V 20/20
See application file for complete search history.

(56) References Cited

U.S. PATENT DOCUMENTS

| | | | |
|---|---|---|---|
| 2015/0302650 A1* | 10/2015 | Abdelmoati | G06F 3/0488 |
| | | | 345/633 |
| 2016/0026426 A1* | 1/2016 | Lee | G06F 3/1454 |
| | | | 345/156 |
| 2016/0247324 A1* | 8/2016 | Mullins | G02B 27/0179 |
| 2018/0307045 A1* | 10/2018 | Nishi | G02B 27/017 |

FOREIGN PATENT DOCUMENTS

| | | | | |
|---|---|---|---|---|
| WO | WO-2020014705 A1 * | 1/2020 | | H04N 13/332 |
| WO | WO-2020076946 A1 * | 4/2020 | | G06F 3/01 |

\* cited by examiner

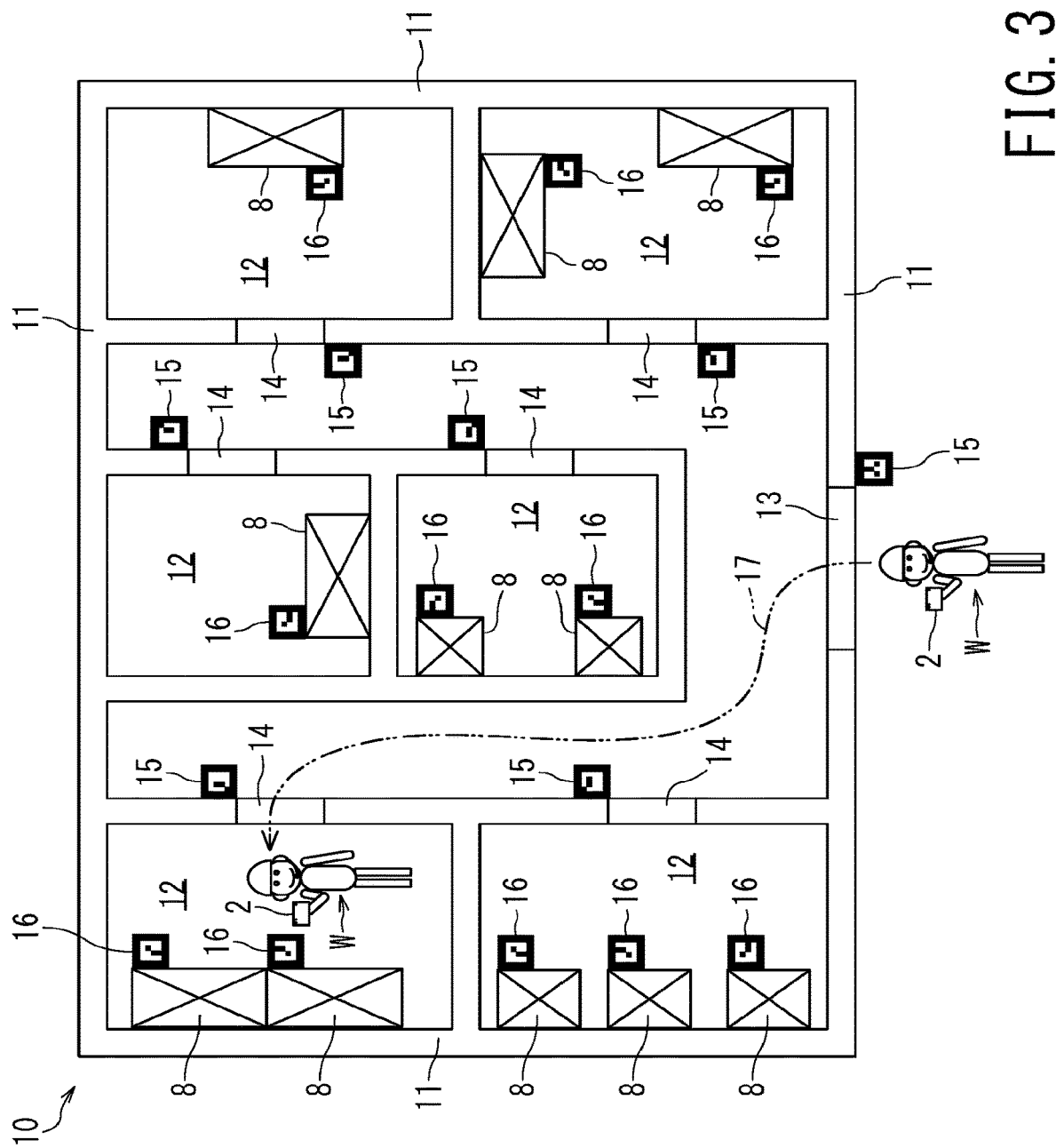

(A) REFERENCE-POSITION MANAGEMENT TABLE

| REFERENCE POSITION ID | 3D POSITIONAL INFORMATION | MARKER ID | TARGET DEVICE ID |
|---|---|---|---|
| B0001 | (X···, Y···, Z···) | M0001 | Q0101, Q0102, Q0103, ··· |
| B0002 | (X···, Y···, Z···) | M0002 | Q0201, Q0202, Q0203, ··· |
| B0003 | (X···, Y···, Z···) | M0003 | Q0301, Q0302, Q0303, ··· |
| B0004 | (X···, Y···, Z···) | M0004 | Q0401, Q0402, Q0403, ··· |
| ··· | ··· | ··· | ··· |

(B) TARGET-EQUIPMENT MANAGEMNT TABLE

| TARGET DEVICE ID | 3D POSITIONAL INFORMATION | MARKER ID | APPEARANCE IMAGE ID | 3D SHAPE ID | SUPPORT IN-FORMATION ID | STATE INF-ORMATION ID | TERMINAL ID | USER ID |
|---|---|---|---|---|---|---|---|---|
| Q0101 | (X···, Y···, Z···) | M5101 | G0201 | K0301 | C0101 | J0101 | T0001, ··· | U0001, ··· |
| Q0102 | (X···, Y···, Z···) | M5102 | G0202 | — | C0102 | J0102 | T0001, ··· | U0001, ··· |
| Q0103 | (X···, Y···, Z···) | — | G0203 | K0303 | C0103 | J0103 | T0001, ··· | U0001, ··· |
| Q0104 | (X···, Y···, Z···) | M5104 | — | K0304 | C0104 | J0104 | T0001, ··· | U0001, ··· |
| ··· | ··· | ··· | ··· | ··· | ··· | ··· | ··· | ··· |

FIG. 4

MAINTENANCE WORK SUPPORT SYSTEM AND MAINTENANCE WORK SUPPORT METHOD

CROSS-REFERENCE TO RELATED APPLICATION

This application is based upon and claims the benefit of priority from Japanese Patent Application No. 2018-213225, filed on Nov. 13, 2018 and Japanese Patent Application No. 2019-192706, filed on Oct. 23, 2019, the entire contents of each of which are incorporated herein by reference.

FIELD

Embodiments described herein relate generally to a maintenance work support system and a maintenance work support method.

BACKGROUND

In conventional maintenance work or maintenance activities, a maintenance worker (hereinafter, shortly referred to as a worker) visually confirms the inspection target, writes the inspection result on a record sheet by hand at the site, and after the worker returns to the office, the worker inputs the record to a personal computer. In such a conventional method, there is a concern that a human error such as an input error occurs due to a heavy load on the worker. For this reason, as a countermeasure for reducing the load on the worker, a technique using an RFID (Radio Frequency Identification) tag is known. In this technique, a patrol inspection is performed by using an inspection system that includes: RFID tags attached to respective devices to be inspected; a portable information terminal configured to be able to send and receive data to and from RFID tags in a contactless manner; and a management PC configured to be able to store inspection data of the portable information terminal. When the worker writes the inspection value of the inspection-target equipment having read visually to the portable information terminal, the worker also writes the latest inspection value in the RFID tag, while checking a specific information of the inspection-target equipment.

There is a demand for using the above-described technique for maintenance work such as inspection and repair of an inspection-target equipment. In the above-described technique, the use of the RFID tag can prevent an error in the correspondence between the inspection-target equipment and the entry column in which the inspection value is to be written. However, in the above-described technique, there is a possibility of causing human errors such as inspecting a device different from the inspection-target equipment, erroneous reading of inspection values, and incorrect entry of written values. Furthermore, there is a problem that it is necessary to bring the tag into contact with the detector and this takes time to recognize the inspection-target equipment.

In view of the above-described problems, an object of embodiments of the present invention is to provide a maintenance work support technique that can reduce human errors and enhance work efficiency.

BRIEF DESCRIPTION OF THE DRAWINGS

In the accompanying drawings:

FIG. 3 is a plan view illustrating a work site where the maintenance work support system is used;

FIG. 4 is schematic diagrams illustrating (A) a reference position management table and (B) a target-equipment management table;

DETAILED DESCRIPTION

Figure 1:
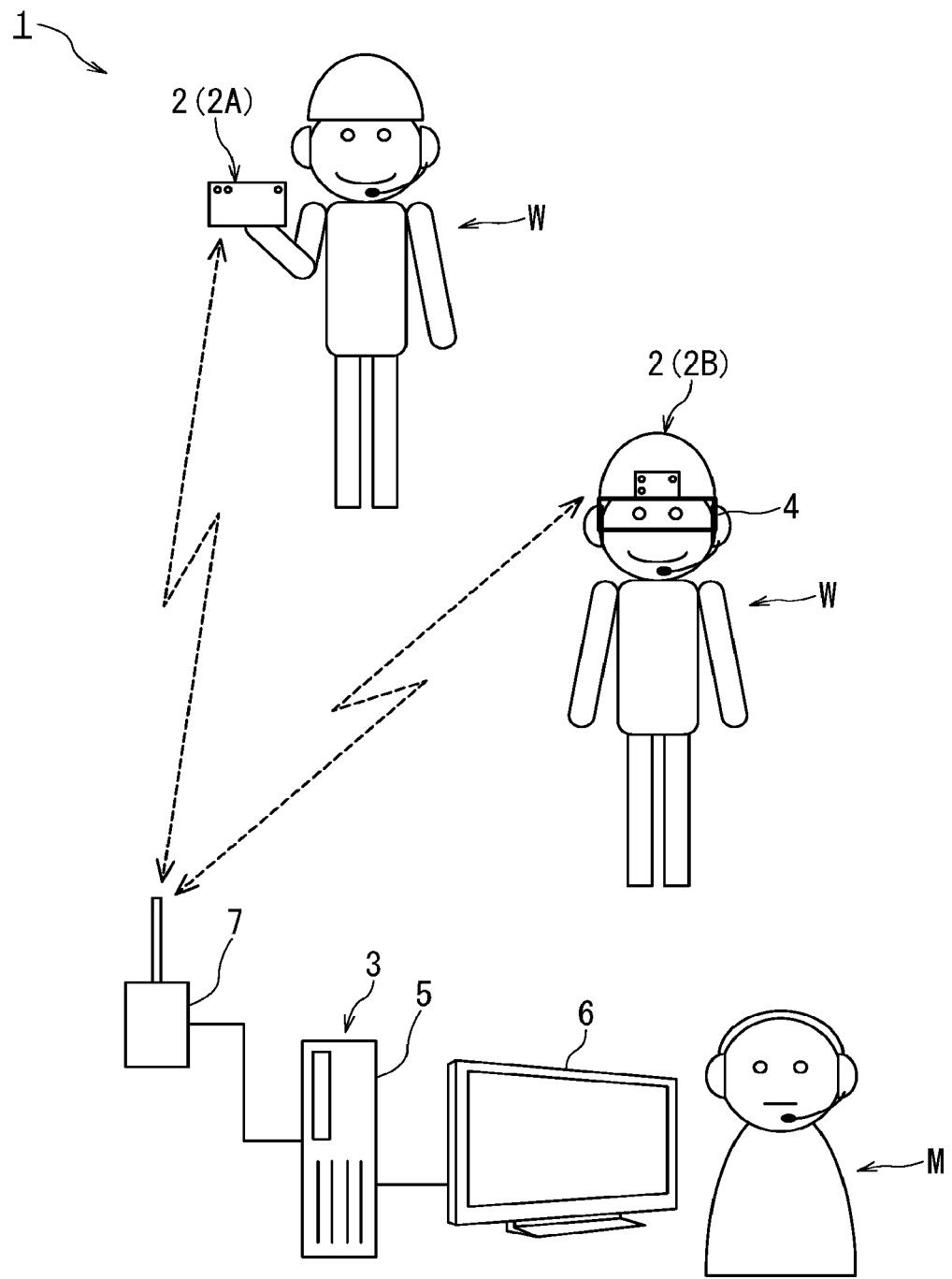
FIG. 1 is a system configuration diagram illustrating a maintenance work support system according to the first embodiment.

In one embodiment of the present invention, a maintenance work support system comprising: a database in which support information for supporting maintenance work is registered; a camera-image acquisition unit configured to acquire a camera-image imaged by a camera that is mounted on a terminal possessed by a worker performing the maintenance work; a position/attitude estimation unit configured to estimate a position and attitude of the terminal based on information that is obtained by at least one device mounted on the terminal; a target recognition unit configured to recognize a target of the maintenance work depicted in the camera-image; and a superimposed display unit configured to perform display processing in such a manner that the support information corresponding to the target acquired from the database is superimposed on least part of an image of the target visually recognized by the worker.

First Embodiment

Hereinafter, respective embodiments of maintenance work support systems and maintenance work support methods will be described in detail by referring to the accompanying drawings. First, a description will be given of the maintenance work support system and the maintenance work support method according to the first embodiment by referring to FIG. 1 to FIG. 19. The reference sign 1 in FIG. 1 indicates the maintenance work support system of the present embodiment.

Conventionally, at a nuclear power plant, a thermal power plant, a chemical plant, or a factory, regular inspection or maintenance is performed for stable operation. In maintenance work such as inspection, it is necessary to improve work quality by improving work efficiency, strengthening information management, and reducing human errors. In the conventional inspection work, a worker visually checks an inspection target, and the worker writes the inspection result by hand on a recording sheet at the site. Further, after the worker returns to the office, the worker inputs the record to a personal computer. In such a conventional method, a human error such as a description mistake on the recording sheet and an input mistake on the personal computer occurs. In addition, since the worker performs the input work twice at the work site and the office, the burden on the worker is high. In order to know what work has been done, there is no other way but to look at the report. In addition, there is a possibility that inconsistencies in work such as oversight and operation mistakes by unskilled engineers occurs due to difference in skills. Furthermore, it is necessary to bring the tag into contact with the detector, and it takes time to recognize the inspection target. The maintenance work support system 1 of the present embodiment can solve the above-described problems.

In the maintenance work support system 1 of the present embodiment, in order to reduce human errors associated with inspection, the inspection target is automatically recognized, and information necessary for inspection is displayed on the terminal screen so as to be superimposed on the on-site image. In addition, this superimposed display is achieved under bilateral cooperation with the system side (database) by using positional information or marker information as a key. Further, control of the display contents from the database to the terminal or efficient data acquisition is supported and records are registered on the database side so that the maintenance work support system 1 integrates the entire information or manages the information in a unified manner.

As shown in FIG. 1, the maintenance work support system 1 of the present embodiment includes: a portable terminal 2 to be possessed by a worker W who performs maintenance work at a work site; and a management computer 3 to be handled by a manager M who manages the work.

The portable terminal 2 of the present embodiment is configured of a smartphone 2A. Moreover, the portable terminal 2 may be configured of a wearable computer (smart glass) 2B provided with the transmissive head mounted display 4 that is mounted on the worker W and is optically transmissive. The portable terminal 2 may be configured of a tablet PC or a notebook PC. Aside from the tablet PC and the notebook PC, the portable terminal 2 may be configured of a plurality of devices that have an imaging function, a calling function, and a communication function. In the following description, the portable terminal 2 configured of the smartphone 2A is illustrated.

The management computer 3 includes: a computer main-body 5 to be handled by the manager M; a display 6 which the manager M uses for visual recognition; and a wireless communication device 7 that performs wireless communication with the portable terminal 2. Note that the management computer 3 of the present embodiment may be a desktop PC or a notebook PC, for example.

The maintenance work support system 1 is a system that supports maintenance work to be performed by the worker W at a work site such as a nuclear power plant, a thermal power plant, a chemical plant, and a factory. A large number of target equipment 8 (FIG. 3) are disposed at the work site, and these target equipment 8 are to be subjected to maintenance work such as inspection and repair.

The worker W uses the portable terminal 2 when performing maintenance work. Support information regarding the target equipment 8 (FIG. 3) can be obtained via the portable terminal 2. Although the support information is provided to the worker W in the present embodiment by using AR (Augmented Reality) technology that adds virtual information to things in the real world, MR (Mixed Reality) technology may be used instead.

At the time of providing the support information, AR image display including display of the support information is performed while camera-images generated by the portable terminal 2 are being displayed. The AR image display is, for example, display of a support image 9 (FIG. 7 and FIG. 8) for designating an inspection position of each target equipment 8 and display of another support image 9 (FIG. 9 and FIG. 10) for indicating an inspection state of each target equipment 8. That is, the support image 9 is displayed so as to be superimposed on the camera-image of each target equipment 8 imaged by the portable terminal 2.

The AR technology is technology in which predetermined contents (i.e., support information) such as a three-dimensional (hereinafter, abbreviated to 3D) model and text are displayed depending on the position of a predetermined object in an image depicting a real environment, for example. In this AR technology, a method of providing contents based on a camera-image imaged by a camera provided in the terminal is called a vision-based AR (image recognition type AR). In this AR technology, a method of providing contents based on positional information and attitude information of the terminal to be obtained from measurement devices such as an acceleration sensor, an angular velocity sensor, and a GNSS (Global Navigation Satellite System) is called a location AR.

A known technique such as a SLAM (Simultaneous Localization and Mapping) technique and a SfM (Structure from Motion) technique can be applied to the position estimation technique that is used for calculating displacement of the position of the portable terminal 2 and displacement of the attitude of the portable terminal 2. In particular, in the present embodiment, the displacement of the position and attitude is calculated on the basis of the image imaged by the portable terminal 2 by using a VSLAM (Visual SLAM) technology.

The maintenance work support system 1 of the present embodiment uses the AR technology (augmented reality technology) and the VSLAM technology (position estimation technology) for enhancing efficiency in maintenance work (i.e., reducing load in maintenance work) such as inspection and recording at the work site and reducing occurrence of human errors by mechanization.

As shown in FIG. 3, a building 10 is illustrated as a sample of a work site (or work area) where the worker W performs maintenance work. For example, the building 10 provided in a predetermined section in a nuclear power plant is the work site. This work site has a plurality of rooms 12 surrounded by walls 11. In each room 12, at least one target equipment 8 to be subjected to maintenance work is disposed. Each of the target equipment 8 may be a meter, an operation switch, a valve, a pipe, a device, or a sensor.

Although the target of maintenance work (i.e., target to be subjected to maintenance work) is illustrated as a plurality of target equipment 8 in the present embodiment, the target of maintenance work may be a predetermined portion of the building 10 or the entirety of the building 10. For example, the target of maintenance work may be a window, a door, a wall, a ceiling, a floor, a passage, an opening in a wall, or a partial range of an indoor space. The target of maintenance work may be a part of one huge apparatus. In addition, the target of maintenance work may be a plurality of locations on in one apparatus.

The entrance (i.e., entrance/exit) 13 of the building 10 is set as a reference position that serves as a reference for estimating the position of the portable terminal 2. A reference marker 15 is disposed at the entrance 13 of the building 10. The entrance (i.e., entrance/exit) 14 of each room 12 is also set as a reference position serving as a reference for estimating the position of the portable terminal 2. Reference markers 15 are also disposed at the respective entrances 14 of these rooms 12. The reference markers 15 may be provided on the respective wall surfaces near the entrances 13 and 14 or may be provided on the respective door surfaces of the entrances 13 and 14.

When the worker W starts maintenance work, the worker W first images the reference marker 15 at the entrance 13 of the building 10 by using the camera function of the portable terminal 2. At this time, the portable terminal 2 estimates its own position and own attitude on the basis of the generated camera-image in which the reference marker 15 is depicted. When imaging of the reference marker 15 is started at the entrance 13 of the building 10 and continued during movement of the portable terminal 2, the portable terminal 2 can estimate the moving path 17 along which the portable terminal 2 has moved from the reference position.

In addition, target markers 16 are disposed at the respective target equipment 8 disposed in the respective rooms 12 or are disposed at the respective positions close to the target equipment 8. The position close to each target equipment 8 indicates a position within a range to be depicted in one camera-image together with the target equipment 8 when the target equipment 8 is imaged by the portable terminal 2. This target marker 16 (i.e., target marker 8 corresponding to one or more specific target equipment 8) functions as an AR marker. That is, the support image 9 is displayed at the coordinates designated on the basis of the relative positional relationship with the target markers 16.

The markers 15 and 16 are graphics (i.e., figures) that can be recognized. For example, a matrix type two-dimensional code and/or a so-called QR code (registered trademark) is used for each of the markers 15 and 16. Each of the markers 15 and 16 includes information on marker ID (Identification) that enables the markers 15 and 16 to be distinguished from each other. In the management database 20 of the management computer 3, the marker IDs of the respective markers 15 and 16 and information on respective target equipment 8 are registered such that the ID of each marker 15 or 16 is linked or associated with the corresponding one or more target equipment 8.

The markers 15 and 16 may be provided in various manner. For example, a panel on which each of the markers 15 and 16 is printed may be generated, and then this panel may be placed on the wall of the work site or in the vicinity of the target equipment 8 before start of maintenance work. Alternatively, the markers 15 and 16 may be directly printed on the wall surface or the target equipment 8.

The portable terminal 2 of the present embodiment can recognize the target equipment 8 on the basis of the target markers 16. In addition, the portable terminal 2 can recognize the target equipment 8 on the basis of the appearance image that has been generated by imaging the appearance of the target equipment 8 in advance of maintenance work. Further, the target equipment 8 can be recognized on the basis of the 3D shape information of each target equipment 8 acquired in advance of maintenance work. The appearance image and 3D shape information of each target equipment 8 are preliminarily registered in the management database 20.

The portable terminal 2 performs control such that the recognition result of the target equipment 8 based on the 3D shape information is given priority over the recognition result of the target equipment 8 based on the appearance image. The portable terminal 2 performs control such that the recognition result of the target equipment 8 based on the target markers 16 is given priority over the recognition result of the target equipment 8 based on the 3D shape information.

Figure 2:
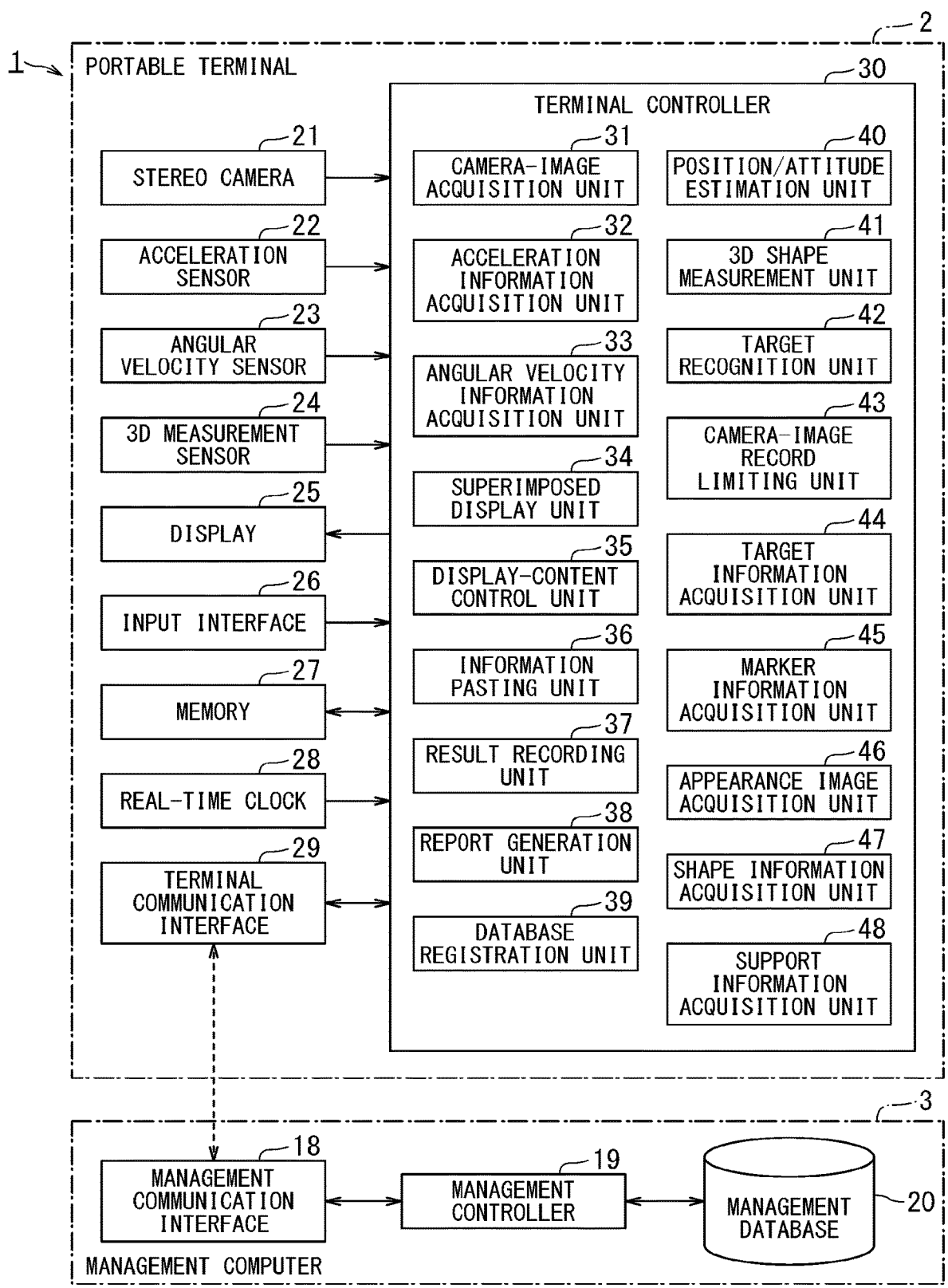
FIG. 2 is a block diagram illustrating the maintenance work support system according to the first embodiment.

Next, the system configuration of the maintenance work support system 1 will be described by referring to the block diagram shown in FIG. 2.

The management computer 3 includes a management communication interface 18, a management controller 19, and a management database 20. The management computer 3 may be provided in a management center at a remote location away from the work site or may be provided in the vicinity of the work site.

The management communication interface 18 communicates with the portable terminal 2 via a communication line. This management communication interface 18 is mounted on the wireless communication device 7. The management communication interface 18 may be mounted on a predetermined network device, for example, a wireless LAN access point or an antenna. The management communication interface 18 may communicate with the portable terminal 2 via a WAN (Wide Area Network), an Internet line, or a mobile communication network. In addition, the management communication interface 18 may communicate with the portable terminal 2 by being connected to the portable terminal 2 via a LAN cable or a USB cable.

The management controller 19 controls the management computer 3 in an integrated manner. In the management controller 19, its CPU executes programs stored in its memory or HDD and thereby implements predetermined functions.

Information necessary for maintenance work such as support information and inspection information on the target equipment 8 is registered in the management database 20. For example, the support information necessary for inspecting the target equipment 8 and state information indicating the state of each of the target equipment 8 are registered. This state information may include information on the inspection plan or the previous inspection record, time information indicating the latest state, or inspection record.

In the management database 20, location information related to the area of the maintenance work is registered. For example, the positional information of the reference position and the positional information of each of the target equipment 8 are registered. The management database 20 is provided in a storage unit such as an HDD of the management computer 3.

In the maintenance work support system 1 of the present embodiment, maintenance work can be supported in various manners by linking the markers 15 and 16 installed in the work site with the management database 20.

For example, information and data to be registered in the management database 20 include support information such as 3D CAD data of the building 10 or the target equipment 8, a piping connection diagram, a device layout diagram, device information, inspection record, and predetermined images necessary for inspection.

When the portable terminal 2 and the management computer 3 can be interconnected online at the work site, the portable terminal 2 and management database 20 can be linked to each other in real time. When the portable terminal 2 and the management computer 3 cannot be interconnected online at the work site, various data are previously downloaded from the management computer 3 to the portable terminal 2 in an online connection environment and the portable terminal 2 is used in an offline state. After acquiring data at the work site, when the portable terminal 2 and management computer 3 are interconnected online again, data are uploaded from the portable terminal 2 to the management database 2.

The portable terminal 2 includes a stereo camera 21 as a device, an acceleration sensor 22 as a device, an angular velocity sensor 23 as a device, a 3D (3D) measurement sensor 24 as a device, a display 25, an input interface 26, a memory 27, a real-time clock (RTC) 28, a terminal communication interface 29, and a terminal controller 30.

The stereo camera 21 is mounted on the portable terminal 2 and images objects around the portable terminal 2 by visible light. The stereo camera 21 includes two imaging elements, each of which is provided on the back side of its housing and includes a lens. The stereo camera 21 can acquire information on the depth direction to the object by simultaneously imaging the object from a plurality of different directions.

Although camera-images acquired by each of the image elements of the stereo camera 21 are two-dimensional images, the difference between images depicted in the two two-dimensional images generated by the respective image elements is used for generating a 3D image by which the 3D structure of the object can be grasped. Camera-images generated by the stereo camera 21 are inputted to the terminal controller 30.

The acceleration sensor 22 is mounted on the portable terminal 2 and detects acceleration to be generated when the portable terminal 2 moves. The acceleration sensor 22 can also detect gravity acceleration. Acceleration information indicating the value of acceleration detected by the acceleration sensor 22 is inputted to the terminal controller 30.

The angular velocity sensor (i.e., gyroscope sensor) 23 is mounted on the portable terminal 2 and detects an angular velocity to be generated when the attitude of the housing of the portable terminal 2 changes. The imaging direction of the stereo camera 21 can be grasped by the attitude of the housing of the portable terminal 2. The angular velocity information indicating the angular velocity value detected by the angular velocity sensor 23 is inputted to the terminal controller 30.

A motion sensor configured as a 9-axis sensor by combining an inertial sensor (i.e., 3-axis acceleration sensor and 3-axis angular velocity sensor) and a 3-axis geomagnetic sensor may be mounted on the portable terminal 2.

The 3D measurement sensor 24 measures the 3D shape of objects around the portable terminal 2. For example, a depth sensor is used for the 3D measurement sensor 24. An infrared sensor or a laser sensor such as LiDAR may be used for the 3D measurement sensor 24.

The 3D measurement sensor 24 is provided on the back side of the housing of the portable terminal 2. The 3D measurement sensor 24 can measure the distance from the portable terminal 2 to the object, for example, by projecting a laser on the object and receiving the reflected light with the use of a light receiving element. In the present embodiment, the 3D measurement sensor 24 measures the distance from the portable terminal 2 to a surrounding object by using a ToF (Time of Flight) method, in which the delay time of the received light pulse with respect to the projected pulse is converted into distance, so as to generate 3D point group data of the measured distance. The imaging direction by the stereo camera 21 and the measurement direction by the 3D measurement sensor 24 are the same.

The display 25 displays camera-images that have been imaged by the stereo camera 21. It is sufficient that camera-images imaged by one of the two imaging elements with a lens are displayed.

The input interface 26 is a device to be operated by the worker W such that predetermined information can be inputted. In the present embodiment, the input interface 26 is configured as a touch panel that is provided integrally with the display 25. When a wearable computer 2B is used as the portable terminal 2, the input interface 26 is disposed at an appropriate position where the worker W can operate it.

The memory 27 stores predetermined data or camera-images imaged by the stereo camera 21. Each camera-image to be stored in the memory 27 may be a moving image or a still image. When the portable terminal 2 is used offline, various data downloaded in advance from the management computer 3 are stored in the memory 27. Part of the data registered in the management database 20 may be stored in the memory 27 or all the data may be stored in the memory 27.

The real-time clock (RTC) 28 measures elapse of time. For example, the real-time clock 28 outputs time information indicating the current time and calendar information indicating the date and day of the week. The real-time clock 28 may include a timer function of integrating the time from a predetermined start time to a predetermined end time.

The terminal communication interface 29 communicates with the management computer 3 via a communication line. The terminal communication interface 29 of the present embodiment includes a network device, for example, a wireless LAN antenna. In addition, the terminal communication unit 29 may perform communication by using a LAN cable or a USB cable. The portable terminal 2 accesses the management database 20 of the management computer 3 via the terminal communication interface 29.

The terminal controller 30 performs overall control of the portable terminal 2. The terminal controller 30 includes a camera-image acquisition unit 31, an acceleration information acquisition unit 32, an angular velocity information acquisition unit 33, a superimposed display unit 34, a display-content control unit 35, an information pasting unit 36, a result recording unit 37, a report generation unit 38, a database registration unit 39, a position/attitude estimation unit 40, 3D shape measurement unit 41, a target recognition unit 42, a camera-image record limiting unit 43, a target information acquisition unit 44, a marker information acquisition unit 45, an appearance image acquisition unit 46, a shape information acquisition unit 47, and a support information acquisition unit 48. The respective functions of these units are implemented by causing the CPU to execute the programs stored in the memory or HDD.

The camera-image acquisition unit 31 performs control to acquire camera-images that have been imaged by the stereo camera 21. Each camera-images imaged by the camera-image acquisition unit 31 may be a moving image or a still image.

The acceleration information acquisition unit 32 performs control to acquire acceleration information indicating the value of acceleration detected by the acceleration sensor 22.

The angular velocity information acquisition unit 33 performs control to acquire angular velocity information indicating the value of the angular velocity detected by the angular velocity sensor 23.

The superimposed display unit 34 performs display control. In this display control, the support image 9 (FIG. 6) corresponding to the target equipment 8 acquired from the management database 20 is superimposed on the (visual) image of the target equipment 8 that is a target to be visually recognized by the worker W via the portable terminal 2. In the case of using the portable terminal 2 offline, the support information corresponding to the target equipment 8 previously stored in the memory 27 is used.

The superimposed display unit 34 displays the support information indicating the position of each target equipment 8, for example. In this manner, the worker W can identify each target equipment 8. The superimposed display unit 34 displays support information indicating the state of the target equipment 8, for example. In this manner, the worker W can grasp the state of each target equipment 8. The superimposed display unit 34 displays support information indicating the result of maintenance work on the target equipment 8, for example. In this manner, the worker W can grasp the result of the maintenance work on the target equipment 8.

The "image of the target to be visually recognized by the worker" includes: an electronically generated image that consists of pixels depicting the target equipment 8 as a whole and is displayed on the display 25; a visual image (i.e., real image) of the target equipment 8 to be directly and visually recognized by the worker W via the transmissive head mounted display 4; and a projection image of the target equipment 8 to be projected by the portable terminal 2 described below, for example. Further, the display 25 may be a reflective head mounted display.

The display-content control unit 35 performs control to change the display content of the support image 9 depending on the plan content or the department to which the worker W belongs. Further, the display-content control unit 35 determines whether the worker W is a staff member to whom display of the support image 9 is permitted or not. That is, the processing of changing the display content of the support image 9 includes processing of determining to display the support image 9 or processing of determining not to display the support image 9.

As to display of an image of the AR tag 49 (FIG. 11) on which predetermined information is described, the information pasting unit 36 performs display control in such a manner that the image of the AR tag 49 is displayed together with the camera-image of the target equipment 8 imaged by the portable terminal 2 so as to be superimposed on this camera-image of the target equipment 8. The AR tag 49 is a virtual tag, and the worker W can write the predetermined information on the AR tag 49 and then virtually paste the AR tag 49 on the target equipment 8. In this manner, when another worker W performs maintenance work next time, the information described on the AR tag 49 can be referred to.

Figure 6:
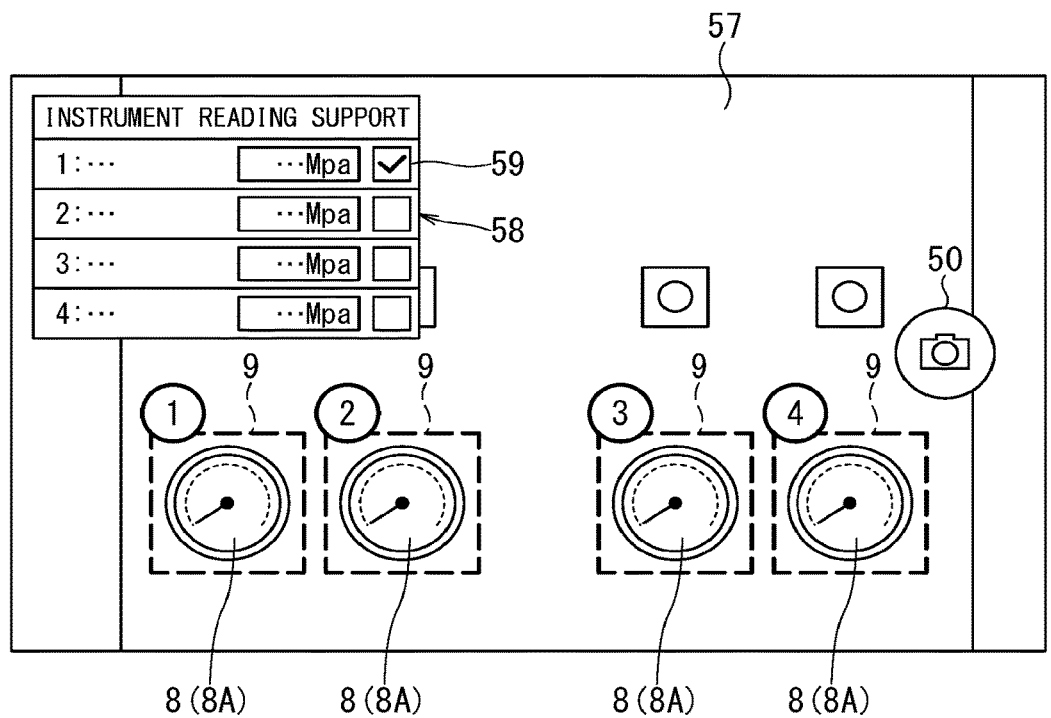
FIG. 6 is schematic diagram illustrating an instrument reading support screen that appears on the portable terminal.

The result recording unit 37 performs control to automatically read information indicating the state of the target equipment 8 on the basis of the camera-image of the target equipment 8 imaged by the stereo camera 21. For example, when the target equipment 8 is an instrument, the value displayed by the instrument is recorded on the basis of the camera-image of the instrument (FIG. 6). That is, the result recording unit 37 performs control to record the confirmation result together with the position of the target equipment 8 and the time information.

Figure 12:
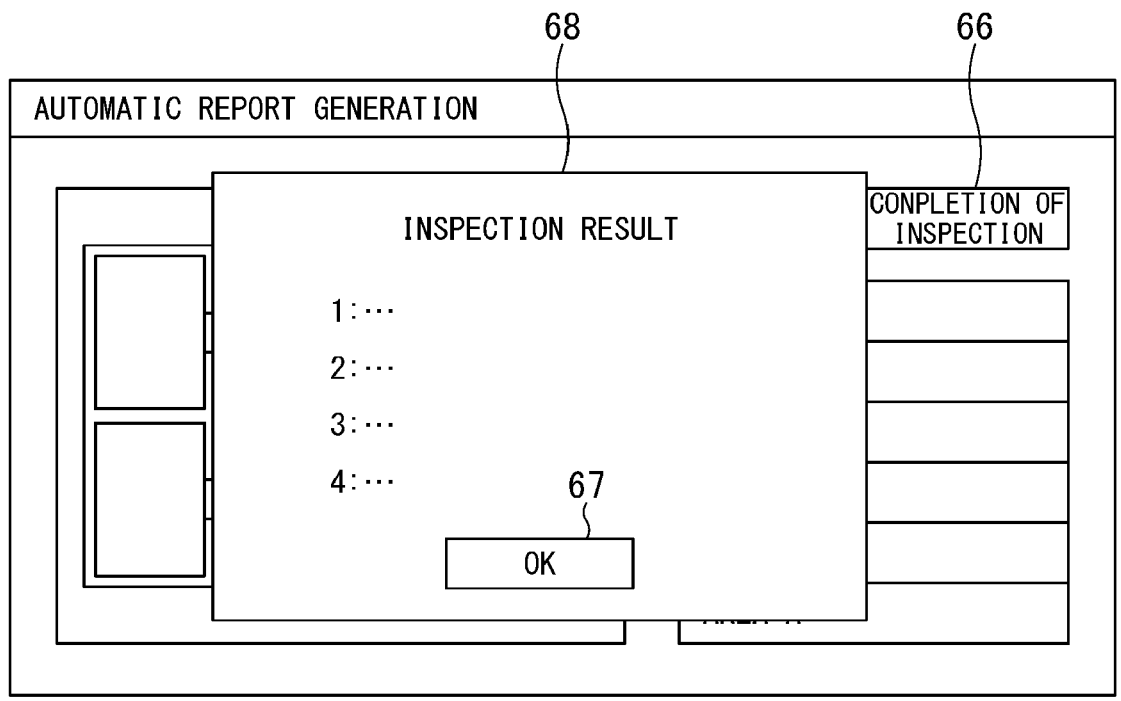
FIG. 12 is schematic diagram illustrating an automatic report generation screen that appears on the portable terminal.

The report generation unit 38 performs control to automatically generate a report on the basis of the recorded inspection contents and positional information after the maintenance work is completed (FIG. 12).

The database registration unit 39 performs control to register the predetermined information acquired by the portable terminal 2 in the management database 20 of the management computer 3.

When the portable terminal 2 is used offline, the database registration unit 39 performs control to store the predetermined information acquired by the portable terminal 2 in the memory 27. When being connected with the management computer 3 online, the database registration unit 39 performs control to register the predetermined information stored in the memory 27 in the management database 20.

The position/attitude estimation unit 40 performs control to estimate the position and attitude of the portable terminal 2 on the basis of the camera-image, acceleration information, and angular velocity information. The position/attitude estimation unit 40 generates an environment map, which includes information on the surrounding environment of the portable terminal 2, at the same time as estimating the position and attitude of the portable terminal 2. That is, the position/attitude estimation unit 40 uses the VSLAM technology. The environment map generated by the portable terminal 2 may be transmitted to the management computer 3. The management computer 3 may store the environment map in the management database 20.

In the VSLAM technology, feature points of objects around the portable terminal 2 can be extracted by using information acquired by the stereo camera 21 and the 3D measurement sensor 24 of the portable terminal 2. The data obtained by collecting these feature points are called 3D feature-point group data Then, the time-sequential camera-images (i.e., moving image) imaged by the stereo camera 21 are analyzed, and the feature points of the objects (for example, the side or corner portion of the box-shaped object) are tracked in real time. On the basis of the 3D feature-point group data, the 3D information of the position and attitude of the portable terminal 2 can be estimated and the environment map can also be generated.

Since the 3D feature-point group data of the objects around the portable terminal 2 are time-sequentially detected at predetermined time intervals, displacement of the position and attitude of the portable terminal 2 can be calculated on the basis of the displacement between respective sets of the 3D feature-point group data (i.e., by repeating the calculation of the displacement between the 3D feature-point group data to be obtained at a certain time and the 3D feature-point group data obtained subsequently). The moving path 17 of the portable terminal 2 prior to the current position and current attitude is obtained from a series of own positions and attitudes to be obtained time-sequentially.

That is, the position/attitude estimation unit 40 performs control to estimate the position and attitude of the portable terminal 2 on the basis of the camera-images continuously imaged during movement of the portable terminal 2 from the reference position. In this manner, the moving path 17 (FIG. 3) along which the portable terminal 2 has moved from the reference position can be estimated from the camera-images, and thus the estimation accuracy of the position and attitude of the portable terminal 2 can be improved.

Although the VSLAM technology for estimating the position and attitude of the portable terminal 2 on the basis of information acquired by the stereo camera 21 and the 3D measurement sensor 24 is illustrated in the present embodiment, estimation of the position and attitude of the portable terminal 2 is not limited to this aspect. For example, the position and attitude of the portable terminal 2 may be estimated by another type of VSLAM technology in which information acquired by an RGB camera, a fisheye camera, a gyroscope sensor, or an infrared sensor is used for estimating the position and attitude. This type of VSLAM technology can measure the position indoors and can calculate 3D coordinates with the highest accuracy among position-information measurement techniques capable of being used indoors, such as beacon or pedestrian dead reckoning (PDR).

Note that the position and attitude of the portable terminal 2 are recorded in association with the calculated time or updated time.

The 3D shape measurement unit 41 performs control to measure the 3D shape of each object around the portable terminal 2 on the basis of the camera-image imaged by the stereo camera 21. Further, the 3D shape of each object around the portable terminal 2 may be acquired on the basis of the measurement result of the 3D measurement sensor 24.

The target recognition unit 42 performs control to recognize the target equipment 8 depicted in a camera-image as a target of the maintenance work. For example, the target recognition unit 42 performs recognition control so as to determine which one of the objects depicted in the camera-image is the target equipment 8, on the basis of the position and attitude (imaging direction) of the portable terminal 2 and the position corresponding to the target equipment 8.

In addition, the target recognition unit 42 performs control to recognize the target equipment 8 on the basis of the environment map. In this manner, the accuracy of estimating the position and attitude of the portable terminal 2 and the recognition accuracy of the target equipment 8 can be improved. In the present embodiment, the position of the portable terminal 2 can be specified even indoors where the satellite positioning system cannot be used. The environment map to be used in the present embodiment may be generated in advance of the maintenance work, may be generated by the portable terminal 2 during the maintenance work, or may be obtained by updating the previously-generated environment map (i.e., generated in advance of the maintenance work) during the maintenance work.

The target recognition unit 42 performs control to recognize the target equipment 8 on the basis of the positional information corresponding to the target marker 16. In this manner, the target equipment 8 can be recognized on the basis of the target marker 16, and thus the recognition accuracy of the target equipment 8 can be improved.

The target recognition unit 42 performs control to recognize the target equipment 8 on the basis of the camera-image in which the target marker 16 is depicted. In this manner, the target equipment 8 can be recognized on the basis of the target marker 16, and thus the recognition accuracy of the target equipment 8 can be improved.

The target recognition unit 42 performs control to recognize the target equipment 8 on the basis of an appearance image that has been imaged in advance. This control includes control for identifying whether the object depicted in the camera-image imaged by the stereo camera 21 is the target equipment 8 or not. In this manner, the target equipment 8 can be recognized on the basis of the appearance of the object depicted in the camera-image, and thus the recognition accuracy of the target equipment 8 can be improved. Since it is unnecessary to provide the target marker 16 on the object related to the target equipment 8, the trouble of providing the target marker 16 can be omitted. That is, the appearance of the target equipment 8 can be used as a substitute for the target marker 16.

The target recognition unit 42 performs control to recognize the target equipment 8 on the basis of 3D shape information. This control includes control for identifying whether an object around the portable terminal 2 is the target equipment 8 or not. In this manner, the target equipment 8 can be recognized on the basis of the 3D shape information of the object, and thus the recognition accuracy of the target equipment 8 can be improved. Since it is unnecessary to provide the target marker 16 on the object related to the target equipment 8, the trouble of providing the target marker 16 can be omitted. That is, the 3D shape information of the target equipment 8 can be used as a substitute for the target marker 16. The 3D shape information may be acquired on the basis of a camera-image imaged by the stereo camera 21 or may be acquired on the basis of the 3D measurement sensor 24.

The camera-image record limiting unit 43 performs control to limit the camera-image acquisition function for imaging the target equipment 8 at the work site. The camera-image acquisition function is a function of storing the camera-image, which corresponds to the timing of pressing the imaging button 50, in the memory 27 during imaging operation of the stereo camera 21 of the portable terminal 2. For example, in the case of using a standard digital camera provided with an optical system and an image sensor, the camera-image record limiting unit 43 restricts the worker W from shooting a photograph at the work site under predetermined conditions.

For example, in the case of imaging objects by using the stereo camera 21 of the portable terminal 2 at normal time, camera-images are time-sequentially generated as a moving image so as to be time-sequentially displayed on the display 25 and are not stored in the memory 27 unless it is otherwise specifically operated. When the worker W touches the imaging button 50 (FIG. 6 to FIG. 11) displayed on the display 25, the camera-image imaged at the timing of the pressing is stored in the memory 27. In the following, a description will be given of the case where the camera-image imaged at the timing of the pressing the imaging button 50 is stored as a still image. In the present embodiment, the camera-image acquisition function is switched between the enabled state and the disabled state depending on whether the imaging button 50 is displayed or not. Note that the camera-images that can be stored by pressing the imaging button 50 are not limited to the still images but includes video images (i.e., moving images).

The target information acquisition unit 44 performs control to acquire the positional information corresponding to the target equipment 8 depicted in the camera-image from the management database 20 of the management computer 3. In the case of using the portable terminal 2 offline, the positional information corresponding to the target equipment 8 downloaded from the management computer 3 in advance is used. Additionally, the target information acquisition unit 44 may download information other than the positional information, and this information to be downloaded includes an appearance image, 3D shape information, support information, and state information. Further, when an environmental map generated in advance is stored in the management computer 3, this environmental map may be downloaded. The downloaded information is stored in the memory 27. In the case of using the portable terminal 2 online, information downloaded from the management computer 3 may be used or information stored in the memory 27 in advance may be used. When the portable terminal 2 is used in the offline state, information stored in the memory 27 is used.

The marker information acquisition unit (i.e., marker position acquisition unit) 45 performs control to acquire positional information corresponding to the markers 15 and 16 depicted in the camera-image from the management database 20 of the management computer 3. In the case of using the portable terminal 2 offline, the marker information acquisition unit 45 uses the positional information that corresponds to the markers 15 and 16 and has been downloaded from the management computer 3 in advance. The marker information acquisition unit 45 performs control to read the marker ID included in the figure of each of the markers 15 and 16.

The appearance image acquisition unit 46 performs control to acquire the appearance image of the target equipment 8 from the management database 20 of the management computer 3, and this appearance image is necessary for the target recognition unit 42 to recognize the target equipment 8. In the case of using the portable terminal 2 offline, the appearance image acquisition unit 46 uses the appearance image that has been downloaded from the management computer 3 in advance.

The shape information acquisition unit 47 performs control to acquire the 3D shape information of the target equipment 8 from the management database 20 of the management computer 3, and this 3D shape information is necessary for the target recognition unit 42 to recognize the target equipment 8. In the case of using the portable terminal 2 offline, the shape information acquisition unit 47 uses the 3D shape information of the target equipment 8 that has been downloaded from the management computer 3 in advance.

The support information acquisition unit 48 performs control to acquire the support information of the target equipment 8 recognized by the target recognition unit 42 from the management database 20 of the management computer 3. In the case of using the portable terminal 2 offline, the support information acquisition unit 48 uses the support information of the target equipment 8 that has been downloaded from the management computer 3 in advance.

As shown in FIG. 4, the management database 20 of the management computer 3 includes a reference-position management table. In the reference-position management table, 3D positional information, each marker ID, and each target equipment ID are registered in association with the reference position ID.

The reference position ID is identification information by which a plurality of reference positions can individually distinguished. One reference position ID is assigned to one reference position.

The 3D positional information to be registered in the reference-position management table is 3D coordinate information that specifies the position where the reference position is provided. The coordinate information includes information specifying the position in the horizontal direction (i.e., X-axis and Y-axis) and in the vertical direction (i.e., Z-axis). This 3D positional information includes information on the orientation or attitude of the reference position.

In the present embodiment, coordinates are set such that one reference marker 15 provided at the entrance 13 of the building 10 is defined as the origin (i.e., coordinate origin). It is not necessarily required that the reference marker 15 is used as the origin, and a predetermined position of the building 10 may be defined as the origin of the coordinates. The 3D positional information may be configured on the basis of a 3D CAD generated at the design stage of the building 10.

The marker ID registered in the reference-position management table is identification information by which a plurality of reference markers 15 can be individually identified or distinguished. One marker ID is assigned to each reference marker 15. Further, in the reference-position management table, one marker ID is assigned to one reference position.

The target equipment ID is identification information by which a plurality of target equipment 8 can be individually identified or distinguished. One target equipment ID is assigned to one target equipment 8.

In the reference-position management table, a plurality of target equipment IDs may be registered for one reference position ID. For example, the respective target equipment IDs of all the target equipment 8 disposed in the building 10 are registered in association with the marker ID of the reference marker 15 of the entrance 13 of the building 10. In addition, the respective target equipment IDs of all the target equipment 8 disposed in each room 12 are registered in association with the marker ID of the reference marker 15 at the entrance 14 of this room 12.

As shown in FIG. 4, the management database 20 of the management computer 3 includes a target-equipment management table. In the target-equipment management table, each 3D positional information, each marker ID, each appearance image ID, each 3D shape ID, each support information ID, each state information ID, each terminal ID, and each user ID are registered in association with each target equipment ID.

The 3D positional information to be registered in the target-equipment management table is positional information indicating coordinates that specifies the position of the target equipment 8, and includes information specifying the position in the horizontal direction (i.e., X-axis and Y-axis) and in the vertical direction (i.e., Z-axis). The 3D positional information includes information related to the orientation or attitude of the target equipment 8.

The marker ID to be registered in the target-equipment management table is identification information by which a plurality of target markers 16 can be individually identified or distinguished. One marker ID is assigned to each target marker 16. In the target-equipment management table, one marker ID may be assigned to one target equipment 8 or one marker ID may be assigned to a plurality of target equipment 8.

Note that a marker ID may not be assigned to each target equipment 8. That is, the target marker 16 does not have to be disposed at the target equipment 8 or in the vicinity of the target equipment 8. In this case, the target equipment 8 is recognized on the basis of the appearance image or the 3D shape information.

The appearance image ID is identification information by which the appearance images of the respective target equipment 8 preliminarily registered in the management database 20 can individually identified or distinguished. A plurality of appearance image IDs may be registered in association with one target equipment ID. That is, a plurality of appearance images obtained by imaging one target equipment 8 from different directions may be preliminarily registered in the management database 20.

The appearance image ID does not need to be assigned to the target equipment 8. In other words, the appearance image of each target equipment 8 may not be registered in the management database 20. In this case, the target equipment 8 are recognized on the basis of the target markers or the 3D shape information.

The 3D shape ID is identification information by which the 3D shape information of each of the target equipment 8 preliminarily registered in the management database 20 can be individually identified or distinguished.

The 3D shape ID does not need to be assigned to the target equipment 8. In other words, the 3D shape information of each target equipment 8 may not be registered in the management database 20. In this case, the target equipment 8 are recognized on the basis of the target markers or the appearance images.

The support information ID is identification information by which the support information corresponding to a plurality of target equipment 8 preliminarily registered in the management database 20 can be individually identified or distinguished. The state information ID is identification information by which the state information corresponding to a plurality of target equipment 8 registered in the management database 20 can be individually identified or distinguished.

The terminal ID is identification information by which the plurality of portable terminals 2 can be individually identified or distinguished. In the target-equipment management table, the terminal ID of the portable terminal 2, which is permitted to provide the support information of the corresponding target equipment 8, is registered in association with the target equipment ID.

The user ID is identification information by which a plurality of workers W can be individually identified. In the target-equipment management table, the user ID of the worker W who is permitted to receive support information of the corresponding target equipment 8 is registered in association with the target equipment ID. The user ID may be used at the time of logging into the portable terminal 2 or may be registered in an ID card possessed by each worker W.

In this manner, in the management database 20, the positional information related to the markers 15 and 16 preliminarily provided in the building 10 at the work site, which is the area of the maintenance work, is registered in association with the target equipment 8. Further, the positional information of the target equipment 8 is also registered. In this manner, the management database 20 can be used for managing the support information and the positional information corresponding to the target equipment in an integrated manner, and consequently, efficiency of maintenance work can be improved. The portable terminal 2 can search the management database 20, in which various data are registered, on the basis of the reference position ID, the target equipment ID, or the three-dimensional positional information.

Figure 5:
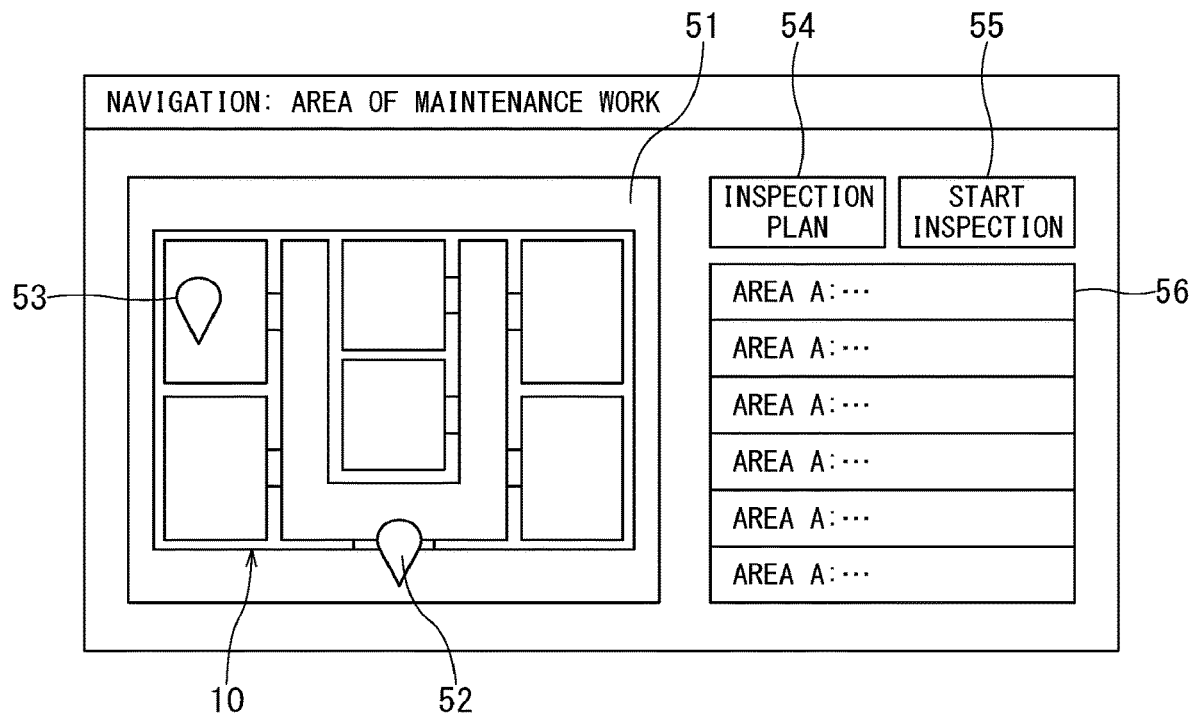
FIG. 5 is a schematic diagram illustrating a navigation screen that appears on a portable terminal.

As shown in FIG. 5, the portable terminal 2 has a navigation function for a maintenance area that is a work site. The worker W reads the reference marker 15 of the entrance 13 of the building 10 by using the portable terminal 2. The position/attitude estimation unit 40 grasps the position of the portable terminal 2, i.e., the position of the worker W on the basis of the reference marker 15. A navigation screen for confirming the inspection contents and the inspection location appears on the display 25 of the portable terminal 2.

The display contents on the navigation screen include: a sketch 51 of the building 10; a mark image 52 indicating the current position of the worker W; a mark image 53 indicating an inspection location where the target equipment 8 to be inspected exists; and a selection input section 54 for displaying an inspection plan, and a selection input section 55 for starting processing related to inspection. Further, when the mark image 53 indicating the inspection location is touch-operated, an item 56 indicating the inspection content is displayed. This navigation screen guides the worker W to the inspection location. Using this navigation function enables the worker W to check the inspection location and can prevent backtracking of work.

As shown in FIG. 6, the portable terminal 2 has an instrument reading support function for reading the numerical value of an analog instrument 8A as the target equipment 8. For example, a predetermined single device 57 is provided with a plurality of analog instruments 8A configured of a pressure gauge and other measuring instruments. The portable terminal 2 continuously images the device 57 by using the stereo camera 21 and time-sequentially displays each camera-image on the display 25 on a real-time basis.

The target recognition unit 42 recognizes the target equipment 8 (analog instrument 8A) depicted in the camera-images on the basis of the position and attitude of the portable terminal 2 and the positional information of the target equipment 8. The target recognition unit 42 can recognize the target equipment 8 on the basis of the appearance image or 3D shape of the target equipment 8 without the target marker 16.

The portable terminal 2 displays a support image 9 indicating that the target equipment 8 are the inspection targets. For example, the portable terminal 2 displays each target equipment 8 surrounded by a frame and also displays the support image 9 in which each target equipment 8 is numbered and visualized. The worker W can recognize the target equipment 8 by the support image 9. The manager M preliminarily registers information on which target equipment 8 are to be inspected in the management database 20.

Further, the result recording unit 37 reads the numerical value indicated by the analog instrument 8A as the target equipment 8 from the camera-image by using image recognition technology. The numerical value having been read is recorded in the recording list 58. The worker W reads the numerical value of the analog instrument 8A visually, and checks the check box 59 when the record in the recording list 58 is correct.

Moreover, the result recording unit 37 stores the check result in the memory 27 together with the positional information of the portable terminal 2 and time information at the timing when the numerical value indicated by the analog instrument 8A is read. When the portable terminal 2 is connected to the management computer 3, the check result is registered in the management database 20.

Since the maintenance work support system 1 of the present embodiment uses the instrument reading support function for reading numerical values indicated by the analog instrument 8A as the target equipment 8, record related to the target equipment 8 can be reliably and efficiently achieved and human errors such as incorrect reading of numerical values or input errors can be prevented.

Figure 7:
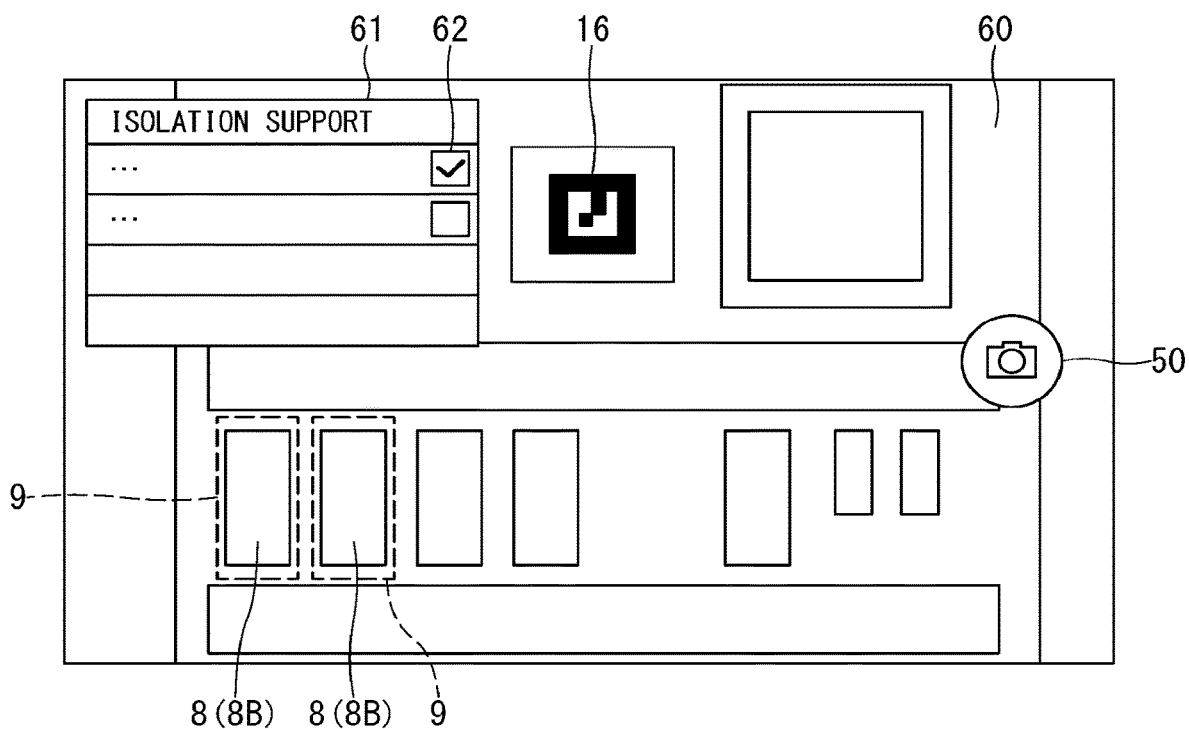
FIG. 7 is schematic diagram illustrating an isolation support screen that appears on the portable terminal.

As shown in FIG. 7, the portable terminal 2 has an isolation support function. A plant such as a power plant is constructed by using a plurality of devices and systems such as a power distribution system, an operating device, and a monitoring device. When construction and maintenance such as inspection and repair is performed for devices or systems in such a plant, it is necessary to ensure the safety of workers and minimize the impact on other devices or other systems. Thus, each device or system to be subjected to maintenance work is electrically isolated from other devices and systems irrelevant to the maintenance work and is subjected to power failure. Such an operation is called isolation.

For example, a single power distribution device 60 is provided with a plurality of switches 8B as target equipment 8. The portable terminal 2 continuously images the power distribution device 60 by using the stereo camera 21 and time-sequentially displays the camera-images on the display 25 in real time.

The target recognition unit 42 recognizes the respective switches 8B depicted in the camera-image on the basis of the position and attitude of the portable terminal 2 and the positional information of the target equipment 8. Each switch 8B may be recognized on the basis of the target marker 16 depicted in the camera-image. The portable terminal 2 displays the support image 9 and the switch 8B that needs to be operated by the isolation work in such a manner that the support image 9 is superimposed on this switch 8B. In this superimposed display, this switch 8B is surrounded with a frame, for example.

In addition, when the worker W performs ON/OFF operation of the switch 8B, the result is recorded by the result recording unit 37. The check list 61 is displayed so that the worker W puts a check mark in the check box 62 corresponding to the switch 8B on which the worker W has performed the maintenance work.

Furthermore, the result recording unit 37 stores the work result of the isolation in the memory 27 together with the positional information of the portable terminal 2 and time information. When the portable terminal 2 is connected to the management computer 3, the work result is registered in the management database 20. In the present embodiment, the isolation support function can prevent mistakes in switch operation and enhance work efficiency.

The portable terminal 2 displays the imaging button 50 (i.e., still-image recording button) when the target recognition unit 42 recognizes the target equipment 8. In the present embodiment, the above-described camera-image acquisition function for the target equipment 8 is enabled only when the target recognition unit 42 recognizes the target equipment 8, i.e., only when the target equipment 8 is shown in the display 25. The portable terminal 2 may be configured such that the camera-image acquisition function for the target equipment 8 is enabled only when the target marker 16 is shown on the display 25.

Figure 8:
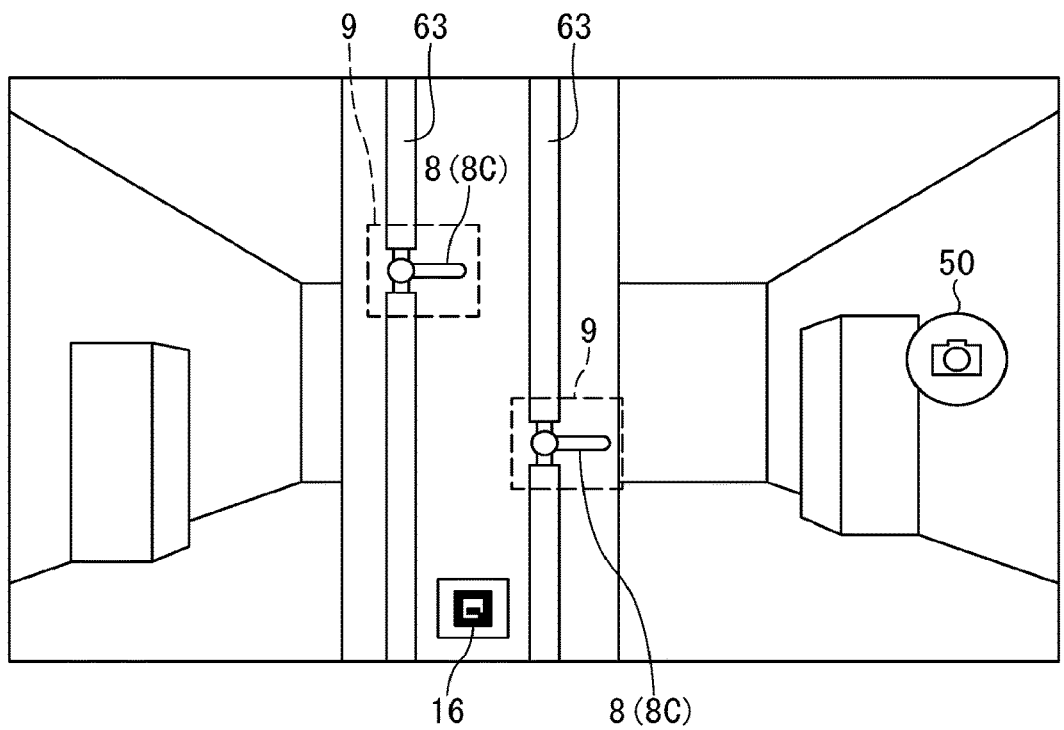
FIG. 8 is schematic diagram illustrating a valve lineup support screen that appears on the portable terminal.

As shown in FIG. 8, the portable terminal 2 has a valve lineup support function. For example, a pipe 63 is provided with a plurality of valves 8C as the target equipment 8. The portable terminal 2 continuously images the pipe 63 by using the stereo camera 21 and time-sequentially displays the camera-images on the display 25 in real time.

The target recognition unit 42 recognizes the respective valves 8C depicted in the camera-image on the basis of the position and attitude of the portable terminal 2 and the positional information of the target equipment 8. Each valve 8C may be recognized on the basis of the target marker 16 depicted in the camera-image. The portable terminal 2 displays the support image 9 and the valve 8C that needs to be checked as to whether it is opened or closed in such a manner that the support image 9 is superimposed on the valve 8C. For example, a display in which the valve 8C is surrounded with a frame is performed.

The result recording unit 37 recognizes the open/close state of each valve 8C on the basis of the camera-image, and the recognized state is recorded. Further, the result recording unit 37 stores the open/close state of each valve 8C in the memory 27 together with the time information and the positional information of the portable terminal 2. When the portable terminal 2 is connected to the management computer 3, the open/close state of each valve 8C is registered in the management database 20. In the present embodiment, the valve lineup support function can prevent a check error and shorten the time for the check work.

Figure 9:
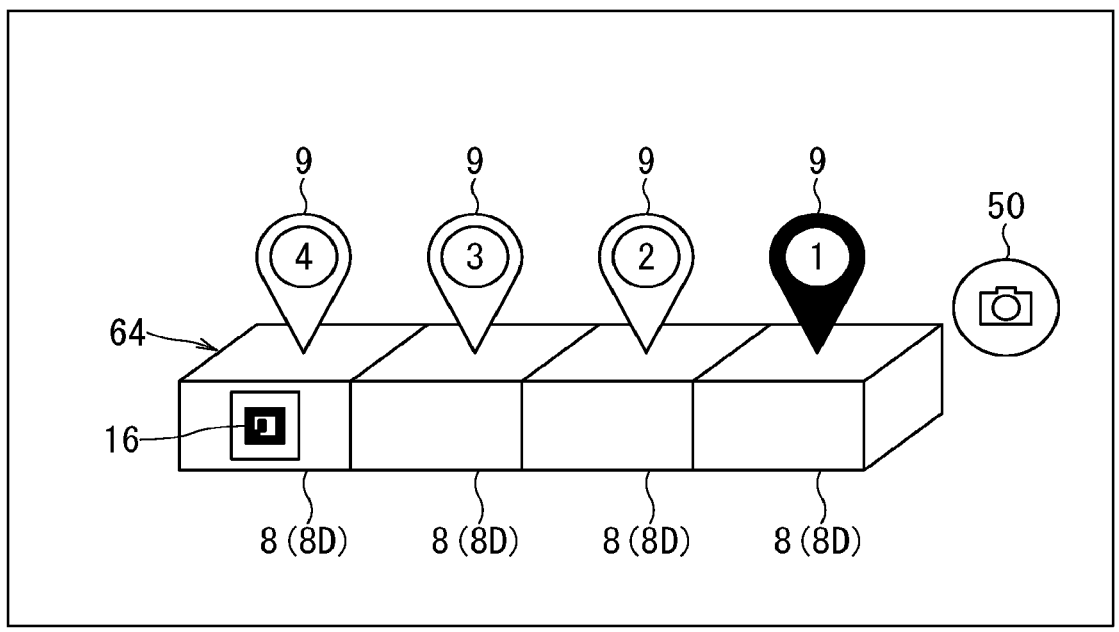
FIG. 9 is schematic diagram illustrating a sensor attachment support screen that appears on the portable terminal.

As shown in FIG. 9, the portable terminal 2 has a sensor attachment support function. For example, during periodic inspection of a driving device 64 such as a pump, a vibration sensor for detecting vibration is attached to a predetermined position and vibration is measured. At this time, the sensor attachment support function of the portable terminal 2 supports confirmation of the attachment position of the vibration sensor. The portable terminal 2 continuously images the drive device 64 by using the stereo camera 21 so as to time-sequentially display the camera-images on the display 25 in real time.

The target recognition unit 42 recognizes the drive device 64 depicted in the camera-image on the basis of the position and attitude of the portable terminal 2 and the positional information of the target equipment 8. The driving device 64 may be recognized on the basis of the target marker 16 depicted in the camera-image. The driving device 64 is composed of a plurality of components 8D as the target equipment 8, and the respective components 8D are different in vibration frequency from each other.

The target recognition unit 42 recognizes the respective components 8D depicted in the camera-image on the basis of the position and attitude of the portable terminal 2 and the positional information of the target equipment 8. Each component 8D may be recognized on the basis of the target marker 16 depicted in the camera-image.

The portable terminal 2 displays the support image 9 that indicates the respective components 8D. For example, each component 8D is numbered, and thereby the position of each component 8D is displayed. The aspect of the support image 9 of the component 8D to which the vibration sensor is attached at the previous periodic inspection is set to a different aspect from the other support images 9. For example, the support image 9 is shown in different colors. The worker W attaches the vibration sensor to the component 8D to which the vibration sensor is attached at the previous periodic inspection. In this manner, variations in measurement due to difference in measurer or measurement time can be prevented. In the present embodiment, an appropriate attachment position of the sensor can be visualized by the sensor attachment support function.

Figure 10:
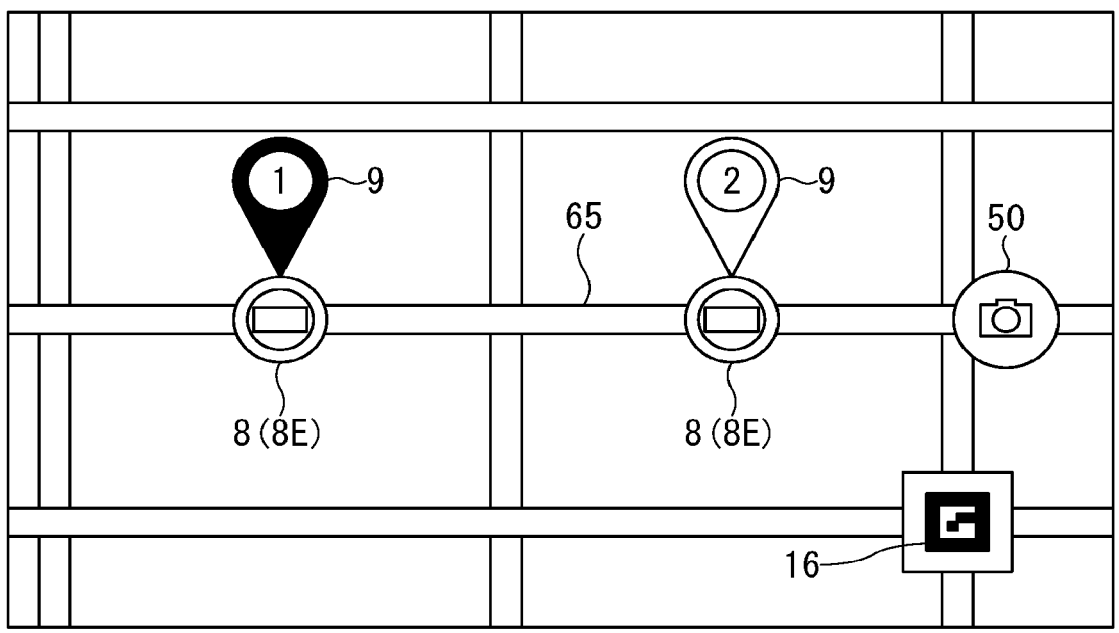
FIG. 10 is schematic diagram illustrating a maintenance-target confirmation support screen that appears on the portable terminal.

As shown in FIG. 10, the portable terminal 2 has a maintenance-target confirmation support function for supporting the work of checking measurement instruments to be regularly inspected such as a flow meter and a gauge. For example, the pipe 65 is provided with a plurality of instruments 8E as the target equipment 8. The portable terminal 2 continuously images the pipe 65 by using the stereo camera 21 so as to time-sequentially display the camera-images on the display 25 in real time.

The target recognition unit 42 recognizes each instrument 8E depicted in the camera-image on the basis of the position and attitude of the portable terminal 2 and the positional information of the target equipment 8. Each instrument 8E may be recognized on the basis of the target marker 16 depicted in the camera-image. The portable terminal 2 displays the support image 9 and the instrument 8E that needs to be checked as to whether it is opened or closed in such a manner that the support image 9 is superimposed on the instrument 8E. For example, according to the plan stored in the management database 20, each calibration time is displayed in different color so as to be distinguishably displayed.

In the present embodiment, the maintenance-target confirmation support function enables prevention of confirmation mistakes, reliable instrument calibration, and reliable recording. In addition, regarding maintenance plans such as instrument calibration, the work contents can be intuitively grasped together with the actual instrument 8E at the work site.

Figure 11:
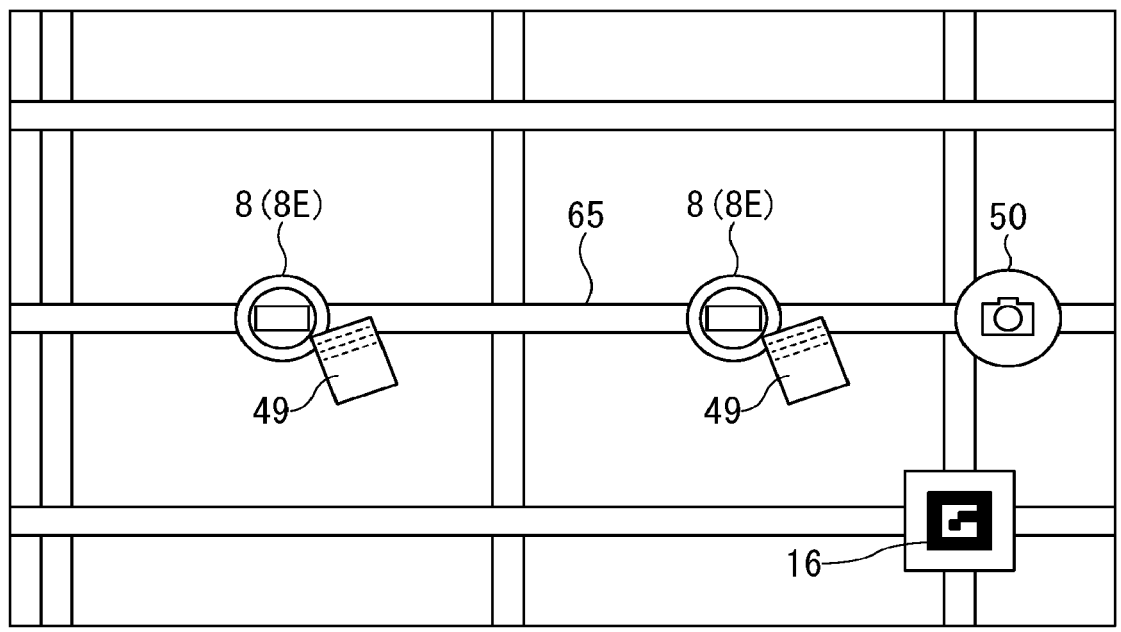
FIG. 11 is schematic diagram illustrating an AR tag pasting screen that appears on the portable terminal.

As shown in FIG. 11, the portable terminal 2 has an AR tag pasting function. With this function, the portable terminal 2 can display the AR tag 49 forming a virtual sticky label or slip such that the AR tag 49 is superimposed on the image of the target equipment 8. For example, it is displayed as sticky labels are pasted on a plurality of instruments 8E as the target equipment 8.

The information pasting unit 36 displays the AR tag 49 and the instrument 8E on the display 25 such that the image of the AR tag 49 is superimposed on the image of the instrument 8E. When the worker W touches the image portion of the instrument 8E being displayed on the display 25, the screen switches to a character input screen. Then, during inspection work or field work, the worker W records points or precautions that the worker W has noticed. This record is written in the AR tag 49 as text data. The text data may be inputted by conversion of voice into text.

The information pasting unit 36 stores the data written in the AR tag 49 in the memory 27 together with the time information and the positional information of the portable terminal 2. When the portable terminal 2 is connected to the management computer 3, the data written in the AR tag 49 are registered in the management database 20. The data written in the AR tag 49 are registered as part of the support information.

In the present embodiment, the AR tag attachment function enables reliable recording of inspection points and reliable management of correction processing. Additionally, the management database 20 manages the data written in the AR tag 49 as a list. Further, the position of the AR tag 49 may be displayed on the map of the navigation screen (FIG. 5) to be displayed on the display 25 of the portable terminal 2 so that another worker W can readily check the data written in the AR tag 49.

As shown in FIG. 12, the portable terminal 2 has an automatic report generation function. With this function, the portable terminal 2 can automatically generate a report on the basis of the recorded inspection contents and the positional information after completion of the maintenance work.

When the worker W touches the selection input section 66 for ending the processing related to the inspection, an inspection result list 68 is displayed. When the target equipment 8 is imaged, the inspection result includes the camera-image of the target equipment 8. When worker W touches the "OK" button 67 in the selection input section 66 for indicating that the inspection result has been confirmed, the report generation unit 38 automatically generates the report.

The report generation unit 38 stores the data of the generated report in the memory 27 together with the time information and the positional information of the portable terminal 2. When the portable terminal 2 is connected to the management computer 3, the report data is registered in the management database 20. In the present embodiment, the automatic report generation function can save labor for re-inputting the inspection records and generating the report in the office, and can reduce the load on worker W.

When the portable terminal 2 and the management computer 3 are in the environment where both can be constantly interconnected, the management computer 3 may automatically generate the report.

The system of the present embodiment includes hardware resources such as a CPU (Central Processing Unit), a ROM (Read Only Memory), a RAM (Random. Access Memory), and a HDD (Hard Disc Drive), and is configured as a computer in which information processing by software is achieved with the use of the hardware resources by causing the CPU to execute various programs. Further, the maintenance work support method of the present embodiment is achieved by causing the computer to execute the various programs.

A description will now be given of the preliminary information registration processing to be executed by the management computer 3 with the flowchart of FIG. 13 by referring to the block diagram of FIG. 2 as required. This preliminary information registration processing is executed when there is an operation to start registration of data in the management database 20.

Figure 13:
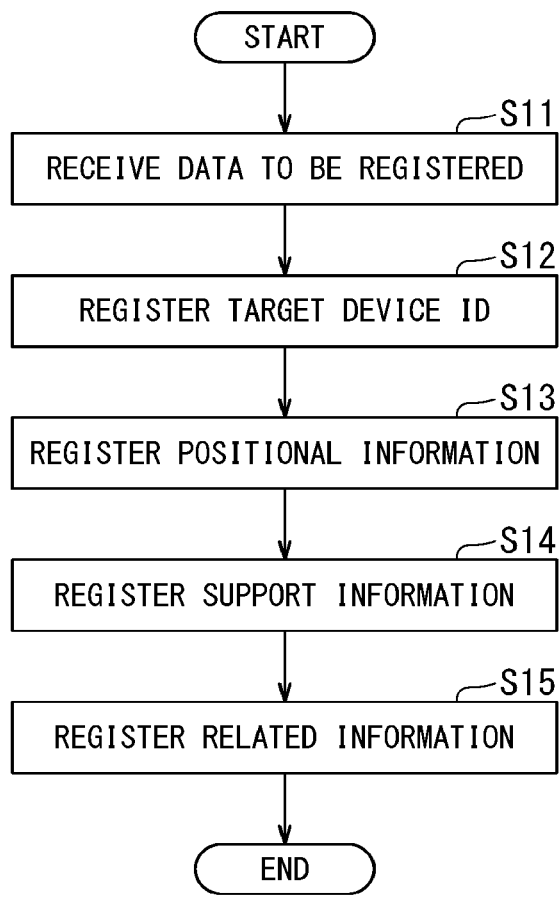
FIG. 13 is a flowchart illustrating preliminary information registration processing to be executed by a management computer.

As shown in FIG. 13, in the step S11, the management controller 19 receives input of data to be registered in the management database 20. The data input operation may be performed by the management computer 3 with the use of an input device such as a mouse and a keyboard or may be performed by another computer connected via a network.

In the next step S12, the management controller 19 registers the target equipment ID included in the received data in the target-equipment management table (FIG. 4).

In the next step S13, the management controller 19 registers the 3D positional information of the target equipment 8 included in the received data in the target-equipment management table FIG. 4).

In the next step S14, the management controller 19 registers the support ID of each target equipment 8 included in the received data in the target-equipment management table (FIG. 4) and registers the support information corresponding to this support ID in management database 20.

In the next step S15, the management controller 19 registers information related to each target equipment 8 included in the received data in the target-equipment management table (FIG. 4). For example, a marker ID, an appearance image ID, a 3D shape ID, a state information ID, a terminal ID, and a user ID are registered in the target-equipment management table.

Although detailed description is omitted, this preliminary information registration processing may include processing of registering the reference position ID, the 3D positional information, the marker ID, and the target equipment ID in the reference-position management table (FIG. 4).

Next, the terminal control processing to be executed by the portable terminal 2 will be described according to the step numbers in the flowchart of FIG. 14 by referring to the block diagram of FIG. 2 as required. This terminal control processing is repeated at regular intervals. This terminal control processing may be interrupted and executed while another processing is being executed.

Figure 14:
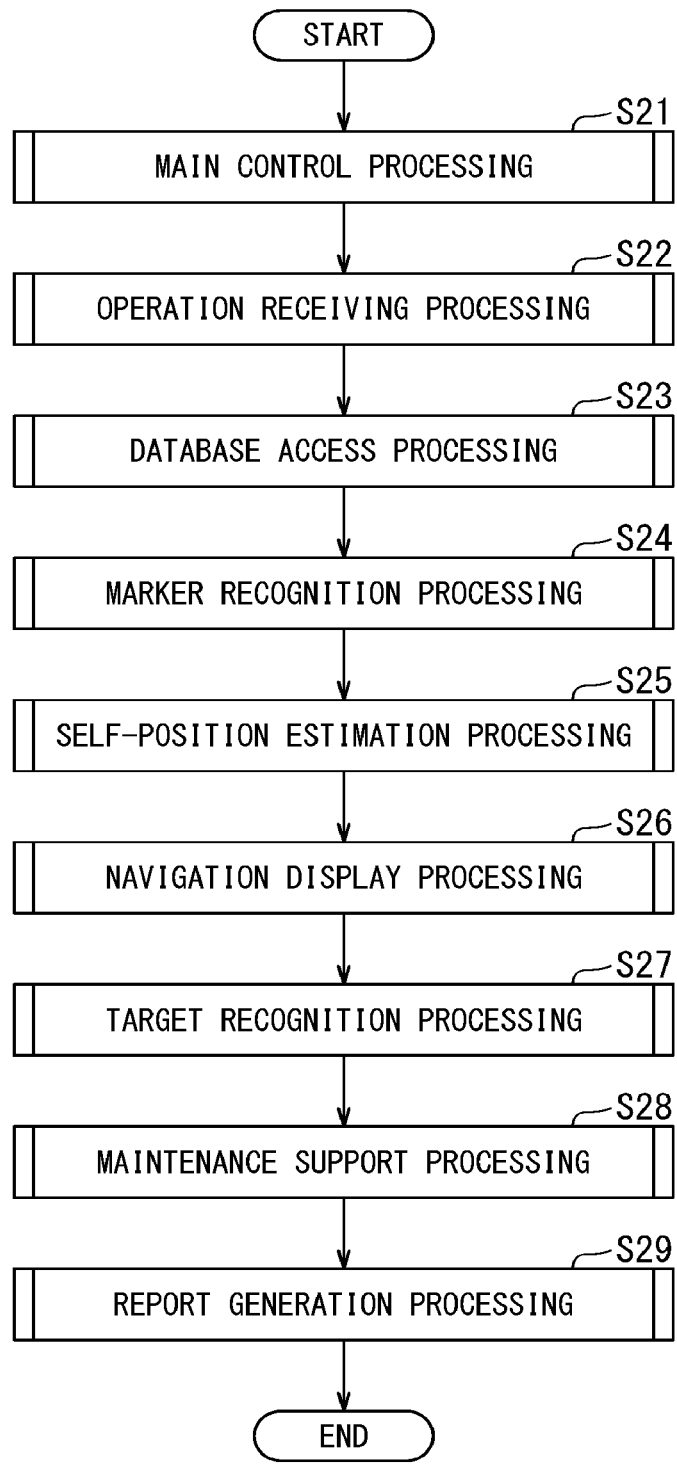
FIG. 14 is a flowchart illustrating terminal control processing to be executed by the portable terminal.

As shown in FIG. 14, in the first step S21, the terminal controller 30 executes main control processing. In this main control processing, processing of controlling various devices such as the display 25 mounted on the portable terminal 2 is performed.

In the next step S22, the terminal controller 30 executes operation receiving processing. In this operation receiving processing, processing of receiving a predetermined input operation via the input interface 26 is performed.

In the next step S23, the terminal controller 30 executes database access processing. In this database access processing, the terminal controller 30 accesses the management database 20 of the management computer 3 and then download or upload various data.

In the next step S24, the terminal controller 30 executes marker recognition processing. In this marker recognition processing, the terminal controller 30 recognizes the markers 15 and 16 on the basis of the camera-image imaged by the stereo camera 21.

In the next step S25, the terminal controller 30 executes self-position estimation processing. In this self-position estimation processing, the terminal controller 30 estimates the position and attitude of the portable terminal 2 on the basis of the camera-image, the acceleration information, and the angular velocity information.

In the next step S26, the terminal controller 30 executes navigation display processing. In this navigation display processing, the terminal controller 30 causes the display 25 to display a navigation screen (FIG. 5) so as to achieve the navigation function.

In the next step S27, the terminal controller 30 executes target recognition processing. In this target recognition processing, the terminal controller 30 recognizes the target equipment 8 depicted in the camera-image as the target to be subjected to the maintenance work.

In the next step S28, the terminal controller 30 executes maintenance support processing. In this maintenance support processing, the terminal controller 30 causes the display 25 to display the support image 9 including the support information.

In the next step S29, the terminal controller 30 executes report generation processing. In this report generation processing, the terminal controller 30 causes the report generation unit 38 to automatically generate the report.

Next, the database access processing to be executed by the portable terminal 2 will be described according to the step numbers in the flowchart of FIG. 15 by referring to the block diagram of FIG. 2 as required.

Figure 15:
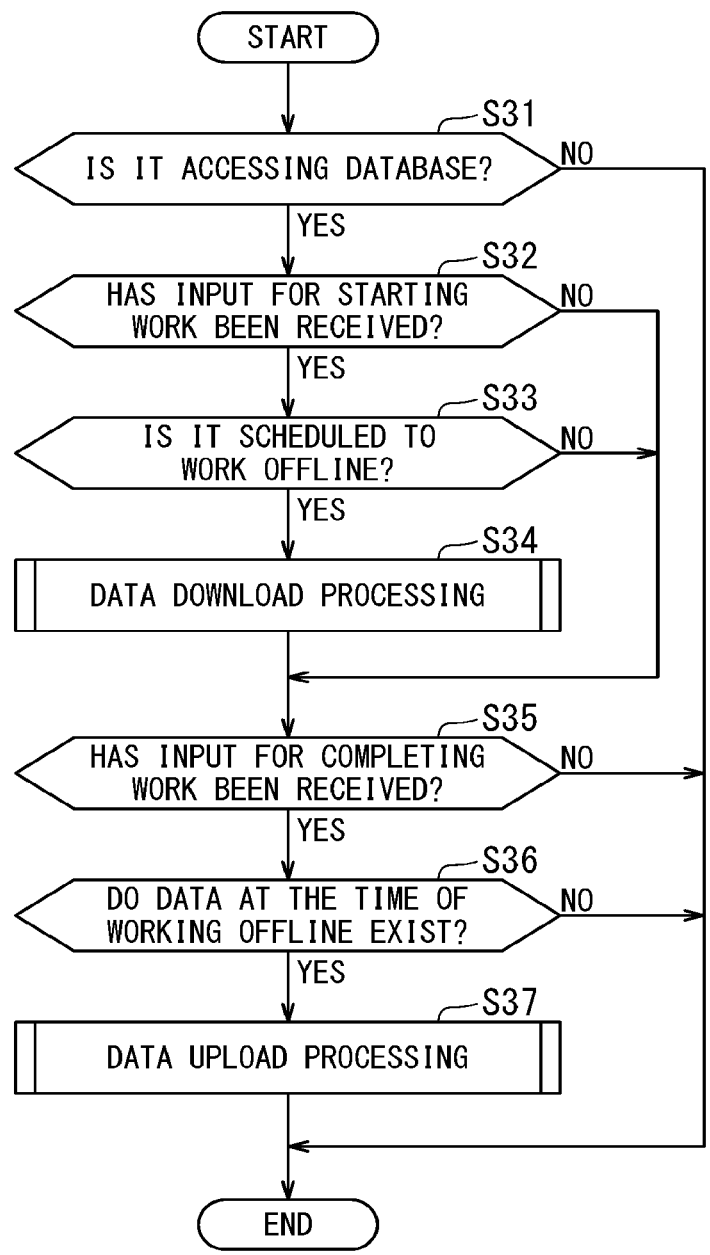
FIG. 15 is a flowchart illustrating database access processing to be executed by the portable terminal.

As shown in FIG. 15, in the first step S31, the terminal controller 30 determines whether the portable terminal 2 is connected to the management computer 3 online and is accessing the management database 20 or not. If the portable terminal 2 is not accessing the management database 20 (NO in the step S31), the processing is completed. If the portable terminal 2 is accessing the management database 20 (YES in the step S31), the processing proceeds to the step 32.

In the next step S32, the terminal controller 30 determines whether the portable terminal 2 has been operated by the worker W so as to receive an input operation for starting work or not. If the portable terminal 2 has not received the input operation for starting work (NO in the step S32), the processing proceeds to the step S35 described below. If the portable terminal 2 has received the input operation for starting work (YES in the step S32), the processing proceeds to the step S33.

In the next step S33, the terminal controller 30 determines whether the portable terminal 2 is not connected to the management computer 3 at the work site or not (i.e., whether it is scheduled to work offline or not). If it is not scheduled to work offline (NO in the step S33), the processing proceeds to the step S35 described below. If it is scheduled to work offline (YES in the step S33), the processing proceeds to the step S34.

In the next step S34, the target information acquisition unit 44 of the terminal controller 30 executes data download processing. In this data download process, various data registered in the management database 20 are downloaded and stored in the memory 27. The data to be downloaded include the appearance image, the 3D shape information, the support information, and the state information. Further, the reference-position management table and the target-equipment management table are downloaded (FIG. 4).

In the next step S35, the terminal controller 30 determines whether the portable terminal 2 has been operated by the worker W so as to receive the input operation for completing the work or not. If the portable terminal 2 has not received the input operation for completing the work (NO in the step S35), the processing is completed. If the portable terminal 2 has received the input operation for completing the work (YES in the step S35), the processing proceeds to the step S36.

In the next step S36, the terminal controller 30 determines whether the data acquired or processed at the time of working in the offline state is stored in the memory 27 or not. If the data acquired or processed at the time of working in the offline state do not exist (NO in the step S36), the processing is completed. If the data acquired or processed at the time of working in the offline state exist (YES in the step S36), the processing proceeds to the step S37.

In the next step S37, the database registration unit 39 executes data upload processing. In this data upload processing, the data, which are acquired or processed at the time of working and are stored in the memory 27, are uploaded to the management computer 3 and registered in the management database 20. The data to be uploaded in this data upload processing include the state information of the target equipment 8. Afterward, the processing is completed.

Next, the marker recognition processing to be executed by the portable terminal 2 will be described according to the step numbers shown in the flowchart of FIG. 16 by referring to the block diagram of FIG. 2 as required.

Figure 16:
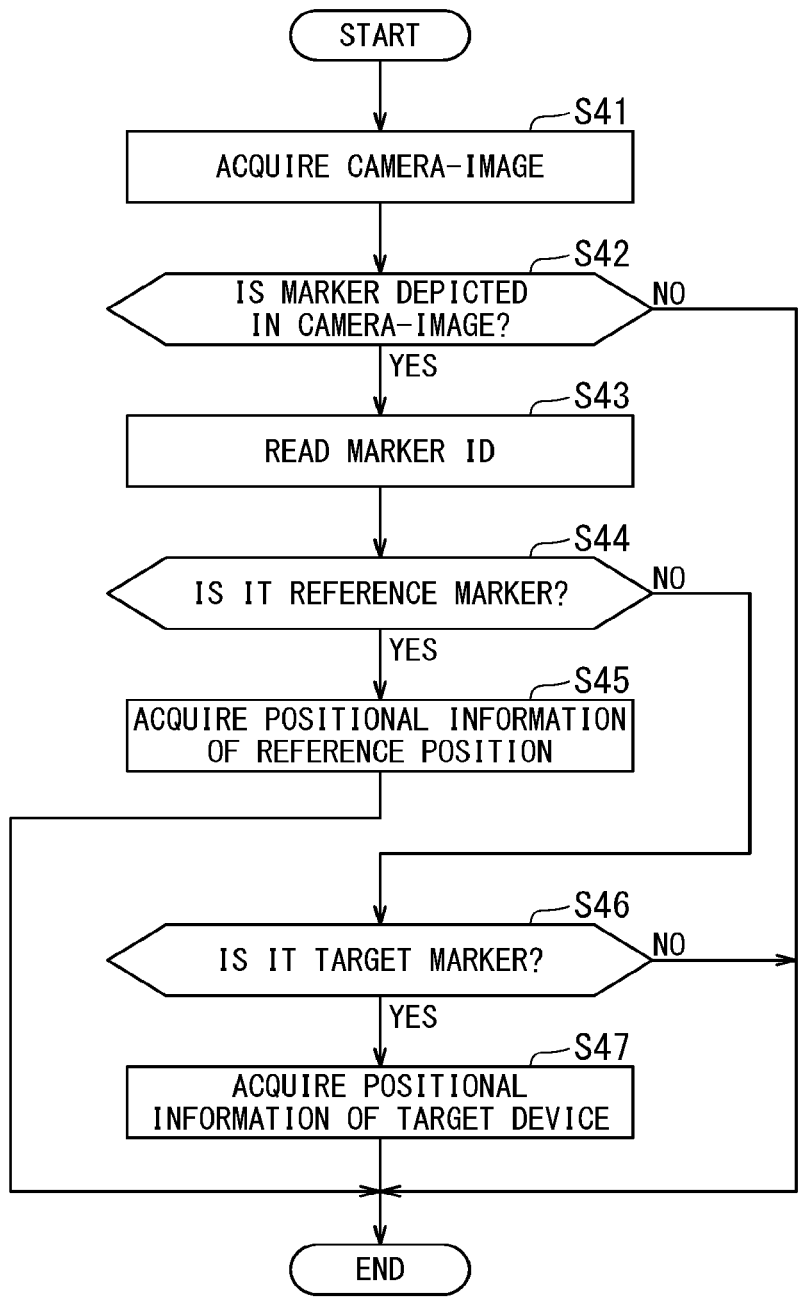
FIG. 16 is a flowchart illustrating marker recognition processing to be executed by the portable terminal.

As shown in FIG. 16, in the first step S41, the camera-image acquisition unit 31 acquires a camera-image imaged by the stereo camera 21.

In the next step S42, the terminal controller 30 determines whether the markers 15 and 16 are depicted in the acquired camera-image or not. If the markers 15 and 16 are not depicted in the camera-image (NO in the step S42), the processing is completed. If the markers 15 and 16 are depicted in the camera-image (YES in the step S42), the processing proceeds to the step S43.

In the next step S43, the marker information acquisition unit 45 reads the marker ID included in the graphics (i.e., figures) of the markers 15 and 16.

In the next step S44, the terminal controller 30 determines whether what is depicted in the camera-image is the reference marker 15 corresponding to the reference position or not. If the reference marker 15 is not depicted in the camera-image (NO in the step S44), the processing proceeds to the step S46 described below. If the reference marker 15 is depicted in the camera-image (YES in the step S44), the processing proceeds to the step S45. In the next step S45, the marker information acquisition unit 45 as the marker position acquisition unit acquires the 3D positional information of the reference position ID, which corresponds to the marker ID having been read, from the management database 20 or from the memory 27, and then the processing is completed.

In the step S46 subsequent to the negative determination in the step S44, the terminal controller 30 determines whether what is depicted in the camera-image is the target marker 16 corresponding to the target equipment 8 or not. If the target marker 16 is not depicted in the camera-image (NO in the step S46), the processing is completed. If the target marker 16 is depicted in the camera-image (YES in the step S46), the processing proceeds to the step S47.

In the next step S47, the marker information acquisition unit 45 acquires the 3D positional information of the target equipment ID, which corresponds to the marker ID having been read, from the management database 20 or from the memory 27, and then the processing is completed.

Next, the self-position estimation processing to be executed by the portable terminal 2 will be described according to the step numbers in the flowchart of FIG. 17 by referring to the block diagram of FIG. 2 as required.

Figure 17:
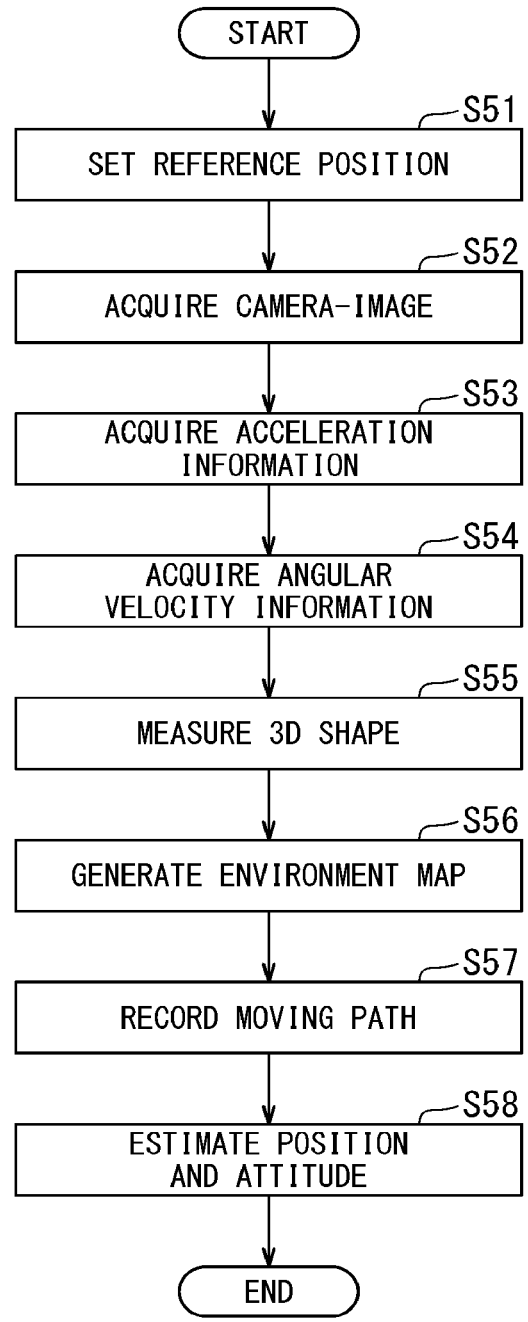
FIG. 17 is a flowchart illustrating self-position estimation processing to be executed by the portable terminal.

As shown in FIG. 17, in the first step S51, the position/attitude estimation unit 40 performs coordinate confirmation processing based on the setting of the reference position serving as the coordinate origin. For example, one reference marker 15 provided at the entrance 13 of the building 10 is defined as the origin, and the reference position is set on the basis of this origin. Until the camera-image of the reference marker 15 is acquired, the display 25 may display a screen for prompting the user to image the reference marker 15.

In the next step S52, the camera-image acquisition unit 31 acquires a camera-image imaged by the stereo camera 21.

In the next step S53, the acceleration information acquisition unit 32 acquires acceleration information indicating the acceleration value detected by the acceleration sensor 22.

In the next step S54, the angular velocity information acquisition unit 33 acquires angular velocity information indicating the angular velocity value detected by the angular velocity sensor 23.

In the next step S55, the 3D shape measurement unit 41 measures the 3D shape of each object around the portable terminal 2 on the basis of the camera-image obtained by the stereo camera 21. The 3D shape of each object around the portable terminal 2 may be acquired on the basis of the measurement result obtained from the 3D measurement sensor 24.

In the next step S56, the position/attitude estimation unit 40 generates an environment map including information on the surrounding environment of the portable terminal 2. If an environmental map having generated in advance exists, this previously generated environmental map is updated.

In the next step S57, the position/attitude estimation unit 40 estimates the position and attitude of the portable terminal 2 on the basis of the time-sequential camera-images that have been continuously imaged during movement of the portable terminal 2 from the reference position. The moving path 17 (FIG. 3) of the portable terminal 2 is recorded by recording the position and attitude of the portable terminal 2 during this movement together with the time information.

In the next step S58, the position/attitude estimation unit 40 estimates the current position and current attitude of the portable terminal 2, and then the processing is completed.

Next, the target recognition processing to be executed by the portable terminal 2 will be described according to the step numbers in the flowchart of FIG. 18 by referring to the block diagram of FIG. 2 as required.

Figure 18:
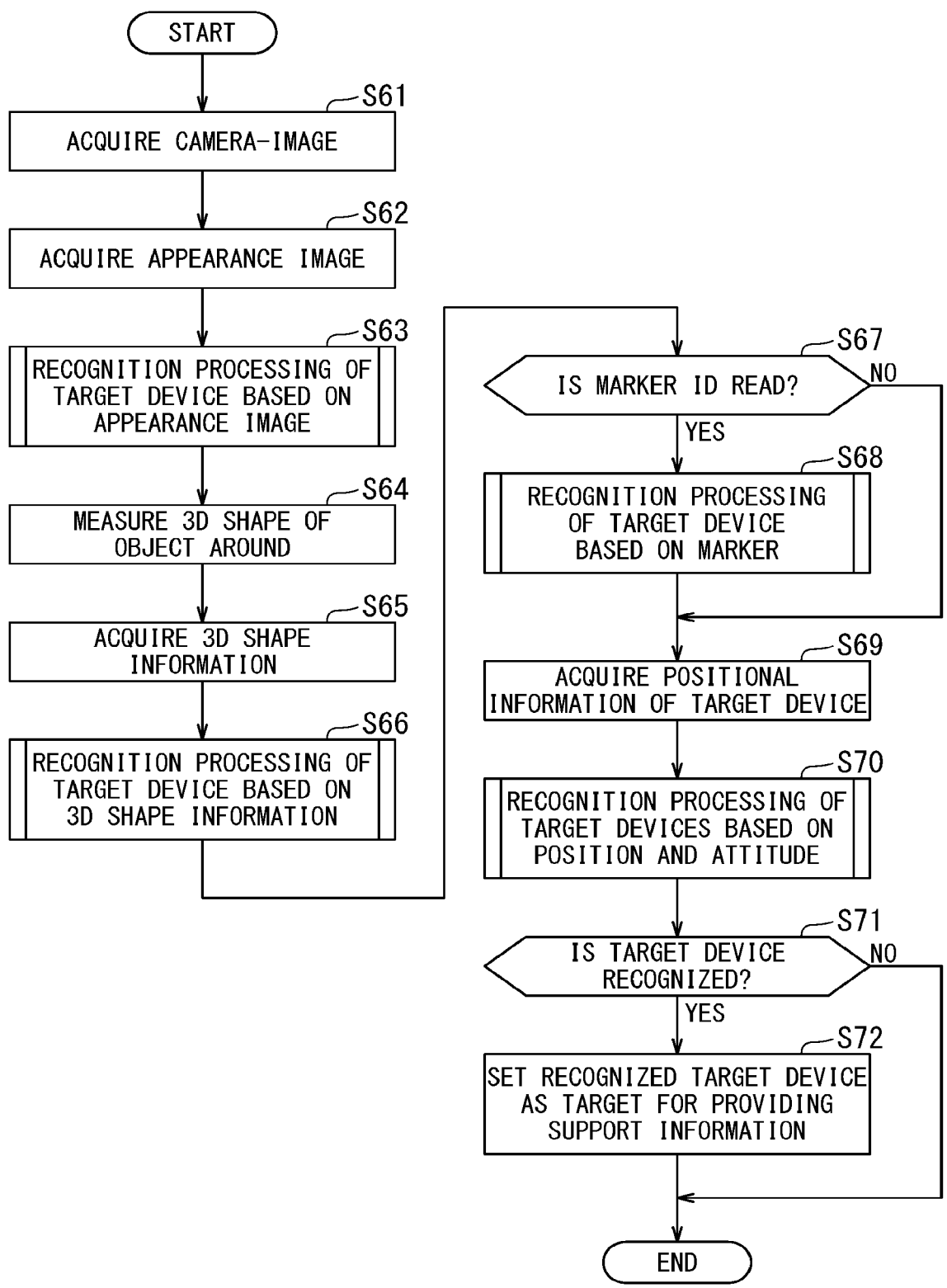
FIG. 18 is a flowchart illustrating target recognition processing to be executed by the portable terminal.

As shown in FIG. 18, in the first step S61, the camera-image acquisition unit 31 acquires a camera-image imaged by the stereo camera 21.

In the next step S62, the appearance image acquisition unit 46 acquires the appearance image of the target equipment 8, which is the target of the maintenance work, from the management database 20 or the memory 27.

In the next step S63, the target recognition unit 42 executes recognition processing of the target equipment 8 on the basis of the appearance image. In this recognition processing, the target equipment 8 is recognized on the basis of the appearance image, which has been imaged in advance of the work and depicts the appearance of the target equipment 8.

In the next step S64, the 3D shape measurement unit 41 measures the 3D shape of each object around the portable terminal 2 on the basis of the camera-image of the stereo camera 21. The 3D shape of each object around the portable terminal 2 may be acquired on the basis of the measurement result obtained by the 3D measurement sensor 24.

In the next step S65, the shape information acquisition unit 47 acquires the 3D shape information of the target equipment 8, which is to be subjected to the maintenance work, from the management database 20 or the memory 27.

In the next step S66, the target recognition unit 42 executes the recognition processing of the target equipment 8 on the basis of the 3D shape information. In this recognition process, the target equipment 8 is recognized on the basis of the 3D shape information of the target equipment 8 acquired in advance of work.

In the next step S67, the terminal controller 30 determines whether the target marker 16 is depicted in the camera-image and the marker ID of this target marker is read or not. If the marker ID is not read (NO in the step S67), the processing proceeds to the step S69 described below. If the marker ID is read (YES in the step S67), the processing proceeds to the step S68.

In the next step S68, the target recognition unit 42 executes the recognition processing of the target equipment 8 on the basis of the target marker 16. In this recognition processing, the target equipment 8 is recognized on the basis of the target marker 16.

In the next step S69, the target information acquisition unit 44 as the target position acquisition unit acquires the 3D positional information of the target equipment 8, which is to be subjected to the maintenance work, from the management database 20 or the memory 27.

In the next step S70, the target recognition unit 42 executes the recognition processing of the target equipment 8 on the basis of the position and attitude of the portable terminal 2. In this recognition processing, the target equipment 8 is recognized on the basis of the position and attitude of the portable terminal 2.

As described above, in the target recognition processing, recognition processing is executed a plurality of times. However, when the target equipment 8 has already been recognized in the previous recognition processing, the subsequent recognition process may be omitted. When the target equipment 8 has already been recognized in the previous recognition processing and this recognition result is different from the recognition result of the subsequent recognition processing, the processing is continued by prioritizing any one of the recognition results.

In the next step S71, it is determined whether the target equipment 8 has been recognized in the above-described recognition processing or not. If the target equipment 8 has not been recognized (NO in the step S71), the processing is completed. If the target equipment 8 has been recognized (YES in the step S71), the processing proceeds to the step S72.

In the next step S72, the terminal controller 30 sets the recognized target equipment 8 as the target for providing the support information, and then the processing is completed.

Next, the maintenance support processing to be executed by the portable terminal 2 will be described according to the step numbers in the flowchart of FIG. 19 by referring to the block diagram of FIG. 2 as required.

Figure 19:
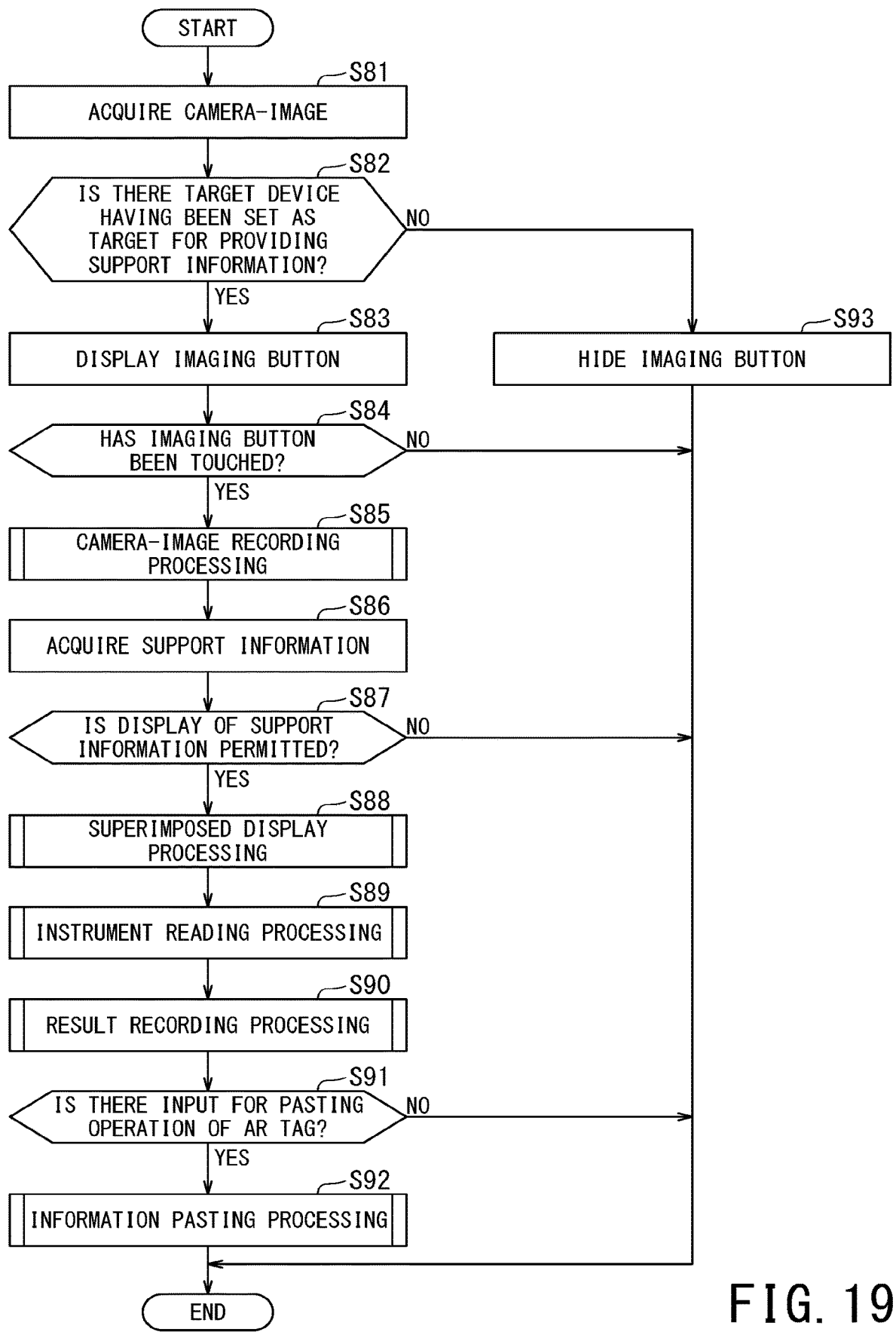
FIG. 19 is a flowchart illustrating maintenance support processing to be executed by the portable terminal.

As shown in FIG. 19, in the first step S81, the camera-image acquisition unit 31 acquires a camera-image imaged by the stereo camera 21.

In the next step S82, the terminal controller 30 determines whether there is at least one target equipment 8 having been set as the target for providing the support information or not. If there is no target equipment 8 having been set as the target for providing the support information (NO in the step S82), the processing proceeds to the step S93 described below. If there is at least one target equipment 8 having been set as the target for providing the support information (YES in the step S82), the processing proceeds to the step S83.

In the next step S83, the camera-image record limiting unit 43 displays the imaging button 50 (FIG. 6 to FIG. 11) on the display 25. In other words, when the imaging button 50 is not displayed on the display 25, the display of the imaging button 50 is started and the acceptance of the touch operation on the imaging button 50 is also started.

In the next step S84, the terminal controller 30 determines whether the imaging button 50 has been touched or not. If the imaging button 50 has not been touched (NO in the step S84), the processing is completed. If the imaging button 50 has been touched (YES in the step S84), the processing proceeds to the step S85.

In the next step S85, the terminal controller 30 executes camera-image recording processing. In this camera-image recording processing, the terminal controller 30 stores the camera-image, which is imaged by the stereo camera 21 at the timing of touching the imaging button 50, in the memory 27 as a still image.

In the next step S86, the support information acquisition unit 48 acquires the support information of the recognized target equipment 8 from the management database 20 or the memory 27.

In the next step S87, the display-content control unit 35 refers to the target-equipment management table (FIG. 4), and then determines whether the terminal ID of the portable terminal 2 or the user ID of the worker W is registered in association with the target equipment ID of the target equipment 8 having been set as the target for providing the support information or not. In other words, the display-content control unit 35 determines whether the display of the support image 9 is permitted or not. If the display of the support image 9 is not permitted (NO in the step S87), the processing is completed. If the display of the support image 9 is permitted (YES in the step S87), the processing proceeds to the step S88.

In the next step S88, the superimposed display unit 34 executes superimposed display processing. In this superimposed display processing, the display 25 displays the support image 9 and the target equipment 8 in such a manner that the support image 9 is superimposed on the target equipment 8.

In the next step S89, the result recording unit 37 executes instrument reading processing. In this instrument reading processing, for example, the result recording unit 37 automatically reads the numerical value indicated by the analog instrument 8A (FIG. 6) that has been imaged by the stereo camera 21.

In the next step S90, the result recording unit 37 executes result recording processing. In this result recording processing, for example, processing of storing the read value indicated by the analog instrument 8A in the memory 27 is performed. When the portable terminal 2 is connected to the management computer 3, the read numerical value of the analog instrument 8A is registered in the management database 20.

In the next step S91, the information pasting unit 36 determines whether the area of the target equipment 8 being displayed on the display 25 has been touched or not, i.e., whether there is an input for the pasting operation of the AR tag 49 (FIG. 11) or not. If there is no input for the pasting operation of the AR tag 49 (NO in the step S91), the process is completed. If there is an input for the pasting operation of the AR tag 49 (YES in the step S91), the processing proceeds to the step S92.

In the next step S92, the information pasting unit 36 executes information pasting processing. In this information pasting processing, a character input screen is displayed and input of text data is accepted. The text data inputted at this time is written in the AR tag 49. The data written in the AR tag 49 is registered as part of the support information. In detail, in the above-described superimposed display processing, the image of the AR tag 49 is superimposed on the image of the target equipment 8 being displayed on the display 25, and then the processing is completed.

In the step S93 subsequent to the negative determination in the step S82, the camera-image record limiting unit 43 hides the imaging button 50 (FIG. 6 to FIG. 11) from the screen of the display 25. In detail, in the case where the imaging button 50 is being displayed on the display 25, the display of the imaging button 50 is terminated and the acceptance of the touch operation on the imaging button 50 is also terminated. Afterword, the processing is completed.

Second Embodiment

Next, the maintenance work support system 1A and the maintenance work support method according to the second embodiment will be described by referring to FIG. 20 to FIG. 22. The same reference signs are assigned to the same components as the first embodiment in each figure, and duplicate description is omitted.

Although the environment map is generated by the portable terminal 2 in the first embodiment, the second embodiment differs from the first embodiment in that the management computer 3 generates the environment map. In the second embodiment, instead of omitting the position/attitude estimation unit 40 (FIG. 2) from the terminal controller 30A, the management controller 19A is provided with the position/attitude estimation unit 69 (FIG. 20).

The second embodiment illustrates an aspect of using the portable terminal 2 and the management computer 3 at the work site in an environment in which both can be constantly interconnected online.

Figure 20:
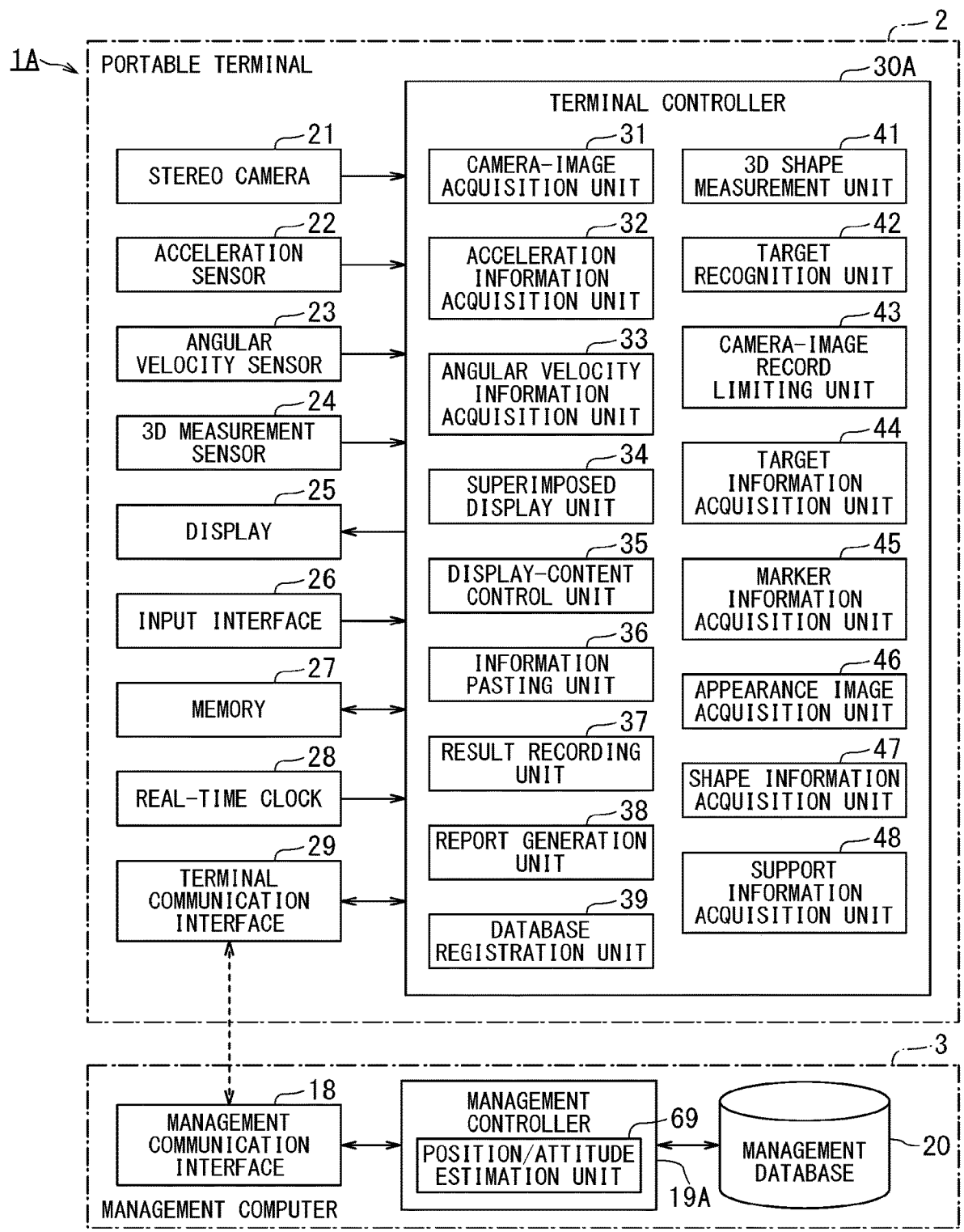
FIG. 20 is a block diagram illustrating a maintenance work support system according to the second embodiment.

As shown in FIG. 20, the management controller 19A of the management computer 3 includes the position/attitude estimation unit 69 that estimates the position and attitude of the portable terminal 2 on the basis of information obtained by the devices mounted on the portable terminal 2. The above-described devices mounted on the portable terminal 2 include the stereo camera 21, the acceleration sensor 22, the angular velocity sensor 23, and the 3D measurement sensor 24.

The management computer 3 communicates with the portable terminal 2 through the management communication interface 18, and receives camera-images, acceleration information, angular velocity information, and 3D feature-point group data that are acquired by the portable terminal 2. The management computer 3 may receive information indicating the reference position that has been set by the portable terminal 2 on the basis of the reference marker 15.

The position/attitude estimation unit 69 estimates the position and attitude of the portable terminal 2 on the basis of the camera-images, the acceleration information, the angular velocity information, and the 3D feature-point group data that are acquired from the portable terminal 2. Further, the position/attitude estimation unit 69 generates an environment map including information on the surrounding environment of the portable terminal 2 simultaneously with the estimation of the position and attitude of the portable terminal 2. That is, the position/attitude estimation unit 69 uses the VSLAM technology. The environmental map generated by the position/attitude estimation unit 69 is registered in the management database 20.

The portable terminal 2 can extract feature points of objects around the portable terminal 2 by using information acquired by the stereo camera 21 and the 3D measurement sensor 24. The 3D feature-point group data obtained by aggregating data of these feature points are transmitted to the management computer 3. The management computer 3 analyzes time-sequentially acquired camera-images (i.e., moving image) imaged by the stereo camera 21 and tracks the feature points of the object in real time. On the basis of the 3D feature-point group data, the three-dimensional information of the position and attitude of the portable terminal 2 can be estimated and the environment map can also be generated. Further, on the basis of a series of positions and attitudes of the portable terminals 2 to be time-sequentially obtained, the moving path 17 (FIG. 3) of the portable terminal 2 preceding the current position and current attitude of the portable terminal 2 is obtained.

Next, the self-position estimation processing to be executed by the portable terminal 2 will be described on the basis of the step numbers in the flowchart of FIG. 21 by referring to the block diagram of FIG. 20 as required.

Figure 21:
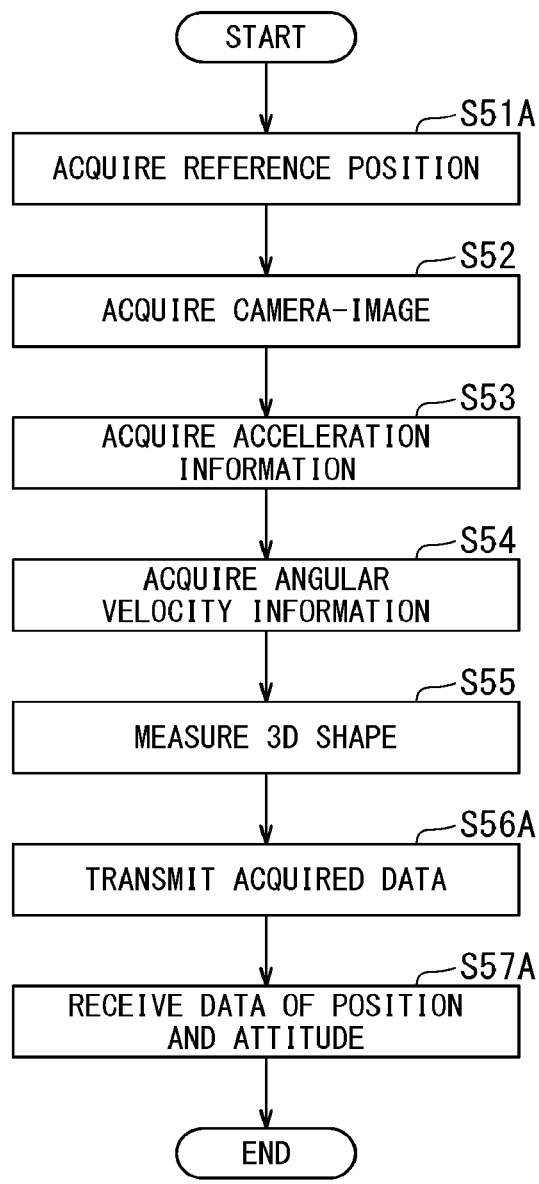
FIG. 21 is a flowchart illustrating the self-position estimation processing to be executed by the portable terminal.

As shown in FIG. 21, first, in the step S51A, the terminal controller 30A acquires the reference position. For example, the reference position is acquired by setting one reference marker 15 provided at the entrance 13 of the building 10 as the origin.

In the next step S52, the camera-image acquisition unit 31 acquires a camera-image imaged by the stereo camera 21.

In the next step S53, the acceleration information acquisition unit 32 acquires acceleration information indicating the value of acceleration detected by the acceleration sensor 22.

In the next step S54, the angular velocity information acquisition unit 33 acquires angular velocity information indicating the value of angular velocity detected by the angular velocity sensor 23.

In the next step S55, the 3D shape measurement unit 41 measures the three-dimensional shape of the object around the portable terminal 2 on the basis of the camera-image of the stereo camera 21. Further, the three-dimensional shape of the object around the portable terminal 2 may be acquired on the basis of the measurement result obtained by the 3D measurement sensor 24.

In the next step S56A, the terminal controller 30A transmits the data acquired by the respective devices of the portable terminal 2 to the management computer 3. The acquired data include the reference position, the camera-images, the acceleration information, the angular velocity information, and the 3D shape of the object around the portable terminal 2. Afterward, the position and attitude of the portable terminal 2 are estimated by the terminal position estimation processing to be executed by the management computer 3 described below.

In the next step S57A, the terminal controller 30A receives data indicating the position and attitude of the portable terminal 2 from the management computer 3, and then the processing is completed.

Next, the terminal position estimation processing to be executed by the management computer 3 will be described on the basis of the step numbers in the flowchart of FIG. 22 by referring to the block diagram of FIG. 20 as required. This terminal position estimation processing is executed when there is access to the management database 20 from the portable terminal 2.

Figure 22:
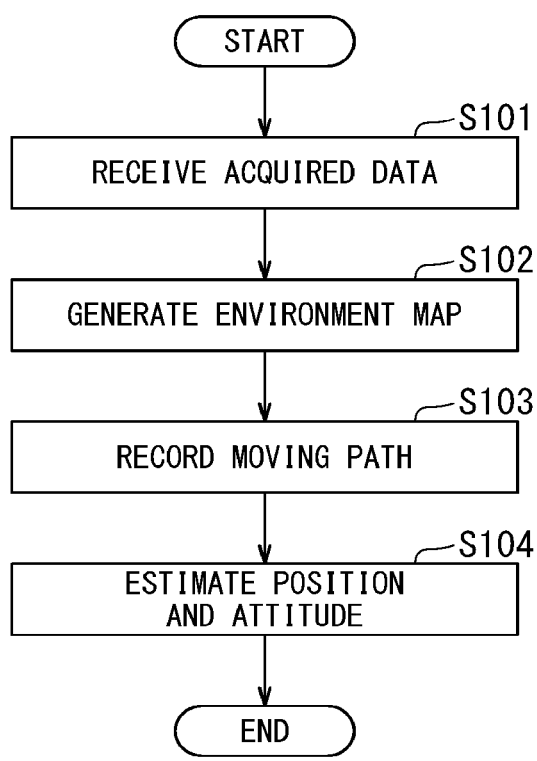
FIG. 22 is a flowchart illustrating terminal position estimation processing to be executed by the management computer.

As shown in FIG. 22, in the first step S101, the management controller 19A receives data from the portable terminal 2. These data include the reference position, the camera-images, the acceleration information, the angular velocity information, and the 3D shape of the object around the portable terminal 2 that are acquired by the devices of the portable terminal 2. Here, the position/attitude estimation unit 69 performs the coordinate confirmation processing based on the setting of the reference position serving as the origin of the coordinates of the portable terminal 2.

In the next step S102, the position/attitude estimation unit 69 generates the environment map in which information on the surrounding environment of the portable terminal 2 is included. The generated environmental map is registered in the management database 20. In the case where an environmental map having generated in advance exists, this previously generated environmental map is updated.

In the next step S103, the position/attitude estimation unit 69 estimates the position and attitude of the portable terminal 2 on the basis of the time-sequential camera-images continuously imaged during movement of the portable terminal 2 from the reference position. The moving path 17 (FIG. 3) of the portable terminal 2 is recorded by recording the position and attitude of the portable terminal 2 during this movement together with the time information.

In the next step S104, the position/attitude estimation unit 69 transmits data indicating the current position and current attitude of the portable terminal 2 to the portable terminal 2, and then the processing is completed.

Since the management computer 3 executes processing of estimating the position and attitude of the portable terminal 2 and processing of generating the environment map in the second embodiment, the processing load on the portable terminal 2 can be reduced. In addition, the environmental map is not stored in portable terminal 2. Thus, even if the portable terminal 2 is taken outside, confidential information indicating the situation (or state) of the work site such as the environmental map is not leaked to the outside.

Although the maintenance work support system and the maintenance work support method according to the above-described embodiments have been described on the basis of the first and second embodiments, the configuration applied in any one of the embodiments may be applied to another embodiment and the configurations applied in the respective embodiments may be used in combination.

For example, the maintenance work support system may be configured to be switchable between the first and second embodiments depending on the environment in the following manner. In detail, the configuration of the second embodiment is applied in the case of using the portable terminal 2 and the management computer 3 in an environment where both can be constantly interconnected online, and the configuration of the first embodiment is applied in the case of using both in an environment where online connection may be interrupted.

Although a mode in which each step is executed in series is illustrated in the flowcharts of the above-described embodiments, the execution order of the respective steps is not necessarily fixed and the execution order of part of the steps may be changed. Additionally, some steps may be executed in parallel with another step.

The system of the above-described embodiments includes a storage device such as a ROM (Read Only Memory) and a RAM (Random Access Memory), an external storage device such as a HDD (Hard Disk Drive) and an SSD (Solid State Drive), a display device such as a display, an input device such as a mouse and a keyboard, a communication interface, and a control device which has a highly integrated processor such as a special-purpose chip, an FPGA (Field Programmable Gate Array), a GPU (Graphics Processing Unit), and a CPU (Central Processing Unit). The system can be achieved by hardware configuration with the use of a normal computer.

Note that each program executed in the system of the above-described embodiments are provided by being incorporated in a memory such as a ROM in advance. Additionally or alternatively, each program may be provided by being stored as a file of installable or executable format in a non-transitory computer-readable storage medium such as a CD-ROM, a CD-R, a memory card, a DVD, and a flexible disk (FD).

In addition, each program executed in the system may be stored on a computer connected to a network such as the Internet and be provided by being downloaded via a network. Further, the system can also be configured by interconnecting and combining separate modules, which independently exhibit respective functions of the components, via a network or a dedicated line.

The portable terminal 2 may be provided with a fisheye lens camera. For example, an omnidirectional image (or spherical image), which is a 360-degree panoramic image in all directions of the worker W, may be simultaneously imaged by using two fisheye lens cameras as an omnidirectional camera. Further, processing of recognizing the target equipment 8 depicted in the omnidirectional image may be performed.

The portable terminal 2 or the management computer 3 may include a computer having artificial intelligence (AI) that performs machine learning. For example, the target recognition unit 42 may be provided with AI. Further, the portable terminal 2 may include a deep learning unit that extracts a specific pattern from a plurality of patterns on the basis of deep learning. In detail, the deep learning unit may cause AI to perform machine-learning of the appearance image or 3D shape related to the target equipment 8 depicted in the camera-image such that the target equipment 8 depicted in the camera-image can be recognized on the basis of the machine learning.

In the analysis using the computer of the above-described embodiments, an analysis technique based on learning of AI can be used. For example, a learning model generated by machine learning using a neural network, a learning model generated by other machine learning, a deep learning algorithm, or a mathematical algorithm such as regression analysis can be used. In addition, forms of machine learning include forms such as clustering and deep learning.

The system of the above-described embodiments includes a computer having AI that performs machine learning. For example, the system may be configured by a single computer that includes a neural network or the system may be configured by a plurality of computers including the neural network.

The above-described neural network is a mathematical model that expresses the characteristics of brain functions by computer simulation. For example, artificial neurons (nodes) that form a network through synaptic connections change the synaptic connection strength through learning and show a model that has acquired problem-solving ability. Furthermore, the neural network acquires problem-solving ability by deep learning.

For example, the neural network is provided with intermediate layers composed of six layers. Each layer of the intermediate layers is composed of, for example, 300 units. In addition, feature amount in a pattern of change in state of a circuit or system can be automatically extracted by causing a multilayer neural network to learn in advance with the use of learning data. On the user interface, the multilayer neural network can set arbitrary number of intermediate layers, arbitrary number of units, arbitrary learning rate, arbitrary number of times of learning, and arbitrary activation function.

The maintenance work support system may use deep reinforcement learning in which a reward function is set for each of various information items to be learned and the information item with the highest value is extracted from the various information items on the basis of the reward function.

For example, a CNN (Convolution Neural Network) that has a proven performance in image recognition is used. In this CNN, the intermediate layer is composed of a convolution layer and a pooling layer. The convolution layer obtains a feature map by applying filtering processing to nearby nodes in the previous layer. The pooling layer further reduces the feature map outputted from the convolution layer so as to generate a new feature map. A slight positional shift in feature amount can be absorbed by acquiring the maximum pixel value in the pixels of the target region of the feature map.

The convolution layer extracts local features of the image, and the pooling layer performs processing of integrating or aggregating the local features. In the processing to be executed by the convolution layer and the pooling layer, the image is reduced in size while maintaining the characteristics of the input image. That is, the CNN can greatly compress (abstract) the amount of information that an image has. Further, the input image can be recognized and the image can be classified by using the abstracted image stored in the neural network.

In deep learning, there are various methods such as an auto encoder, an RNN (Recurrent Neural Network), a LSTM (Long Short-Term Memory), and a GAN (Generative Adversarial Network). These methods may be applied to the deep learning of the present embodiment.

The transmissive head mounted display 4 applicable to the above-described embodiments includes a transmissive screen (for example, a half mirror) and a projection device (for example, a projector) that projects an image on the transmissive screen. The worker W can visually recognize the displayed image while visually recognizing the external scenery through the transmissive head mounted display 4. The image displayed on the transmissive head mounted display 4 is displayed so as to have a predetermined transmittance at which the background can be seen. Additionally, the background may be displayed in a non-transparent manner.

The head mounted display 4 provided in the wearable computer 2B of the above-described embodiments may be a retinal projection type head mounted display that projects an image directly on the human retina. In this manner, the support image 9 can be clearly seen without being influenced by the eyesight of the worker. In addition, the range in which the support image 9 is displayed (i.e., the viewing angle) can be increased. Further, the power consumption, size reduction, or weight reduction of the head mounted display can be achieved.

The portable terminal 2 of the above-described embodiments may include a projector that projects (displays) an image on a peripheral object. Further, the portable terminal 2 may project the image of the support image 9 onto a surrounding object by using a projection mapping technique. In this manner, the support information can be provided to the surrounding workers other than the worker who possesses the portable terminal 2.

The size and weight of the portable terminal 2 of the above-described embodiments may be any size and weight by which the portable terminal 2 can be carried by the worker. For example, the portable terminal 2 may be fixedly installed and used by using a fixing device such as a tripod at the work site.

In order to specify the position of the portable terminal 2 of the above-described embodiments, a satellite positioning system may be used as an auxiliary.

Although the stereo camera 21 provided with two imaging elements, each of which includes a lens, is illustrated as a device mounted on the portable terminal 2 of the above-described embodiments, a device mounted on the portable terminal 2 is not limited to such an aspect. For example, a normal camera including one image element with a lens may be mounted on the portable terminal 2. When this normal camera is mounted on the portable terminal 2 and the VSLAM technology is used, feature points of the object around the portable terminal 2 are extracted by using information acquired by this normal camera and the 3D measurement sensor 24 so that the position and attitude of the portable terminal 2 are estimated on the basis of the extracted feature points.

Although the feature points of the object around the portable terminal 2 are extracted on the basis of information acquired by the stereo camera 21 and the 3D measurement sensor 24 of the portable terminal 2 in the above-described embodiments, methods of extracting the feature points of the object around the portable terminal 2 are not limited to the above-described aspect. For example, the feature points of the object around the portable terminal 2 may be extracted on the basis of information acquired only by the stereo camera 21. The stereo camera 21 can acquire information on the depth direction to the object by simultaneously imaging the object from a plurality of different directions. Thus, the feature points of the object around the portable terminal 2 can be extracted without using the 3D measurement sensor 24, and the position and attitude of the portable terminal 2 can be estimated without using the 3D measurement sensor 24.

According to the embodiments described above, the position/attitude estimation unit for estimating the position and attitude of the terminal on the basis of the information obtained by the device mounted on the terminal is provided, and thus human errors can be reduced and work efficiency can be enhanced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A maintenance work support system comprising:
   a database in which support information for supporting maintenance work and positional information related to an area of the maintenance work are registered; and
   a controller that controls at least one of a terminal or a management computer,
   wherein the controller is configured to:
      acquire a camera-image imaged by a camera that is mounted on the terminal possessed by a worker performing the maintenance work,
      acquire, from the database, the positional information corresponding to the target of the maintenance work depicted in the camera-image,
      generate an environment map including a three-dimensional shape information of an object related on a surrounding environment of the terminal, while estimating a position and attitude of the terminal based on information that is obtained by devices mounted on the terminal, wherein the devices include an acceleration sensor and an angular velocity sensor, and further include at least one of a depth sensor or the camera,
      recognize the target of the maintenance work depicted in the camera-image based on the position and attitude of the terminal, the positional information corresponding to the target of the maintenance work, and the environment map,
      perform display processing such that the support information corresponding to the target acquired from the database is superimposed on at least a part of an image of the target visually recognized by the worker,
      restrict the worker from imaging the target at the area of the maintenance work,
      wherein processing to restrict the worker includes:
         determining whether or not the target depicted in the camera-image is related to the support information, when acquiring the camera-image imaged by the camera,
         displaying an imaging button on the terminal if the target depicted in the camera-image is related to the support information, the camera-image being stored in a memory when the imaging button is operated by the worker, and
         non-displaying an imaging button on the terminal if the target depicted in the camera-image is not related to the support information.

2. The maintenance work support system according to claim 1, wherein:
   the positional information is registered in the database, the positional information being related to at least one marker provided in advance in the area of the maintenance work in association with the target of the maintenance work, and the controller is further configured to:
acquire the positional information corresponding to the at least one marker depicted in the camera-image from the database, and
recognize the target of the maintenance work based on the positional information corresponding to the at least one marker.

3. The maintenance work support system according to claim 2, wherein:
the at least one marker comprises a plurality of markers; and
each of the plurality of markers includes identification information by which the plurality of markers can be individually identified.

4. The maintenance work support system according to claim 2, wherein:
the at least one marker is provided at the target of the maintenance work or at a position close to the target of the maintenance work; and
the controller is configured to further recognize the target of the maintenance work based on the camera-image in which the at least one marker is depicted.

5. The maintenance work support system according to claim 2, wherein:
the at least one marker is provided at a reference position in the area of the maintenance work; and
the controller is further configured to estimate the position and attitude of the terminal based on a plurality of camera-images that are continuously imaged by the camera during movement of the terminal from the reference position.

6. The maintenance work support system according to claim 1, wherein;
an appearance image of the object related to the target of the maintenance work is registered in the database, the appearance image having been imaged in advance of the maintenance work; and
the controller is further configured to:
acquire the appearance image from the database, and
recognize the target of the maintenance work based on the appearance image.

7. The maintenance work support system according to claim 1, wherein:
three-dimensional shape information of the object related to the target of the maintenance work is registered in the database, the three-dimensional shape information having been acquired in advance of the maintenance work; and
the controller is further configured to:
acquire the three-dimensional shape information from the database,
measure three-dimensional shape of the object around the terminal based on the camera-image, and
recognize the target of the maintenance work based on the three-dimensional shape information.

8. The maintenance work support system according to claim 1, wherein the controller is further configured to display the support information indicating a position of the target of the maintenance work.

9. The maintenance work support system according to claim 1, wherein the controller is further configured to display the support information indicating the state of the target of the maintenance work.

10. The maintenance work support system according to claim 1, wherein the controller is further configured to display the support information that indicates a result of the maintenance work having been performed on the target of the maintenance work.

11. A maintenance work support system including a terminal possessed by a worker of maintenance work,
wherein the terminal comprises:
a terminal communication interface configured to communicate with a management computer having a database in which support information for supporting the maintenance work and positional information related to an area of the maintenance work are registered;
devices configured to include an acceleration sensor and an angular velocity sensor, and further include at least one of a depth sensor or a camera; and
a terminal controller that controls the terminal,
wherein the terminal controller is configured to:
acquire a camera-image imaged by the camera that is mounted on the terminal,
acquire, from the database, the positional information corresponding to the target of the maintenance work depicted in the camera-image,
generate an environment map including a three-dimensional shape information of an object related on a surrounding environment of the terminal, while estimating a position and attitude of the terminal based on information that is obtained by the devices mounted on the terminal,
recognize the target of the maintenance work depicted in the camera-image based on the position and attitude of the terminal, the positional information corresponding to the target of the maintenance work, and the environment map,
perform display processing such that the support information corresponding to the target acquired from the database is superimposed on at least a part of an image of the target visually recognized by the worker,
restrict the worker from imaging the target at the area of the maintenance work,
wherein processing to restrict the worker includes:
determining whether or not the target depicted in the camera-image is related to the support information, when acquiring the camera-image imaged by the camera,
displaying an imaging button on the terminal if the target depicted in the camera-image is related to the support information, the camera-image being stored in a memory when the imaging button is operated by the worker, and
non-displaying an imaging button on the terminal if the target depicted in the camera-image is not related to the support information.

12. A maintenance work support system including a management computer that manages a terminal possessed by a worker of maintenance work,
wherein the management computer comprises:
a management communication interface configured to communicate with the terminal;
a database in which support information for supporting the maintenance work and positional information related to an area of the maintenance work are registered; and
a management controller that controls the management computer, wherein the management controller is configured to generate an environment map including a three-dimensional shape information of an object related on a surrounding environment of the terminal, while estimating a position and attitude of the terminal based on information that is obtained by devices mounted on the terminal, wherein the devices include an acceleration sensor and an angular velocity sensor, and further include at least one of a depth sensor or a camera, and wherein the terminal is configured to:
   acquire a camera-image imaged by the camera that is mounted on the terminal,
   acquire, from the database, the positional information corresponding to the target of the maintenance work depicted in the camera-image,
   recognize the target of the maintenance work depicted in the camera-image based on the position and attitude of the terminal, the positional information corresponding to the target of the maintenance work, and the environment map,
   perform display processing such that the support information corresponding to the target acquired from the database is superimposed on least part of an image of the target visually recognized by the worker,
   restrict the worker from imaging the target at the area maintenance work,
   wherein processing to restrict the worker includes:
   determining whether or not the target depicted in the camera-image is related to the support information, when acquiring the camera-image imaged by the camera,
   displaying an imaging button on the terminal if the target depicted in the camera-image is related to the support information, the camera-image being stored in a memory when the imaging button is operated by the worker, and
   non-displaying an imaging button on the terminal if the target depicted in the camera-image is not related to the support information.

13. A maintenance work support method comprising:
registering support information for supporting maintenance work and positional information related to an area of the maintenance work in a database;
acquiring a camera-image imaged by a camera that is mounted on a terminal possessed by a worker performing the maintenance work;
acquiring, from the database, the positional information corresponding to the target of the maintenance work depicted in the camera-image;
generating an environment map including a three-dimensional shape information of an object related on surrounding environment of the terminal, while estimating a position and attitude of the terminal based on information that is obtained by at least one device mounted on the terminal, wherein the devices include an acceleration sensor and an angular velocity sensor, and further include at least one of a depth sensor or the camera;
recognizing the target of the maintenance work depicted in the camera-image based on the position and attitude of the terminal, the positional information corresponding to the target of the maintenance work, and the environment map;
displaying such that the support information corresponding to the target acquired from the database is superimposed on at least a part of an image of the target visually recognized by the worker;
   restricting the worker from imaging the target at the area of the maintenance work,
   wherein processing to restrict the worker includes:
   determining whether or not the target depicted in the camera-image is related to the support information, when acquiring the camera-image imaged by the camera,
   displaying an imaging button on the terminal if the target depicted in the camera-image is related to the support information, the camera-image being stored in a memory when the imaging button is operated by the worker, and
   non-displaying an imaging button on the terminal if the target depicted in the camera-image is not related to the support information.

\* \* \* \* \*